United States Patent [19]
Watters et al.

[11] Patent Number: 5,611,029
[45] Date of Patent: Mar. 11, 1997

[54] RUN SLICE LINE DRAW ENGINE WITH NON-LINEAR SHADING CAPABILITIES

[75] Inventors: John J. Watters, Spring; Giang H. Dao, Houston, both of Tex.

[73] Assignee: Compaq Computer Corporation, Houston, Tex.

[21] Appl. No.: 422,326

[22] Filed: Apr. 13, 1995

Related U.S. Application Data

[63] Continuation-in-part of Ser. No. 381,104, Jan. 31, 1995.

[51] Int. Cl.$^6$ ................................................. G06F 15/00
[52] U.S. Cl. ................................................. 395/131
[58] Field of Search ................................. 395/143, 142, 395/140, 131; 345/136, 138, 153

[56] References Cited

U.S. PATENT DOCUMENTS

| | | | |
|---|---|---|---|
| 5,265,210 | 11/1993 | Vatti et al. | 395/143 |
| 5,303,339 | 4/1994 | Ikuma | 395/132 |
| 5,349,369 | 9/1994 | Kim | 345/136 |
| 5,392,392 | 2/1995 | Fischer et al. | 395/162 |
| 5,416,893 | 5/1995 | Herrell et al. | 395/122 |

OTHER PUBLICATIONS

IBM Technical Disclosure Bulletin, vol. 21, No. 5, Oct. 1978, pp. 2041–2044.
IBM Technical Disclosure Bulletin, vol. 22, No. 8B, Jan. 1980, pp. 3744–3747.
IBM Technical Disclosure Bulletin, vo. 18, No. 4, Sep. 1975, pp. 1075–1077.

*Primary Examiner*—Phu K. Nguyen
*Attorney, Agent, or Firm*—Vinson & Elkins L.L.P.

[57] ABSTRACT

A graphics controller for use in a computer system includes a run slice line draw engine to generate a line as a plurality of slices. The run slice line draw engine can perform non-linear scaling and shading of lines in accordance with a parametric equation by approximating the parametric equation as a polyline with a plurality of linear segments. The polyline approximation can be generated using information concerning each derivative of the parametric equation. Each linear segment of the polyline includes a plurality of slices generated by the run slice line draw engine. By approximating the polyline as a plurality of linear segments, non-linear scaling and/or shading by the run slice line draw engine can be performed without complex mathematical computations.

24 Claims, 20 Drawing Sheets

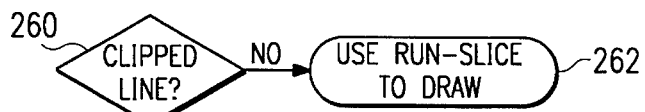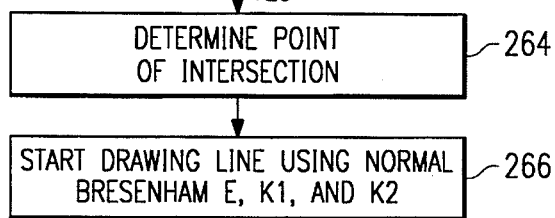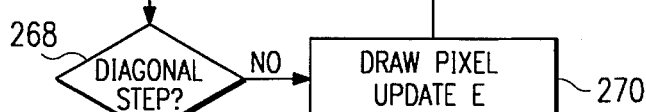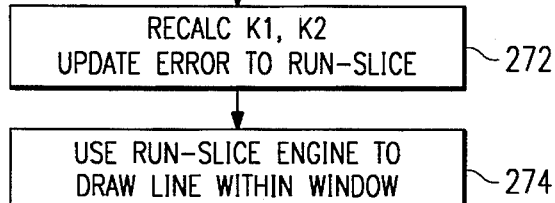
FIG. 18

FIG. 19
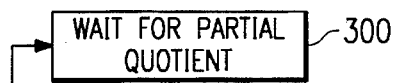
FIG. 20
| DIVIDER CYCLE | E | NUM | DEN | PARTIAL RC | SLICE LENGTH |
|---|---|---|---|---|---|
| 1 | −80 | 80 | 6 | 8 | Q |
| 2 | −32 | 32 | 6 | 4 | Q |
| 3 | −8 | 8 | 6 | 1 | Q |
| 4 | −2 | 2 | 6 | 1 | Q |
| 5 | 4 | 4 | 20 | 1 | Q+1 |
| 6 | −16 | 16 | 6 | 2 | Q |
FIG. 21

FIG. 28
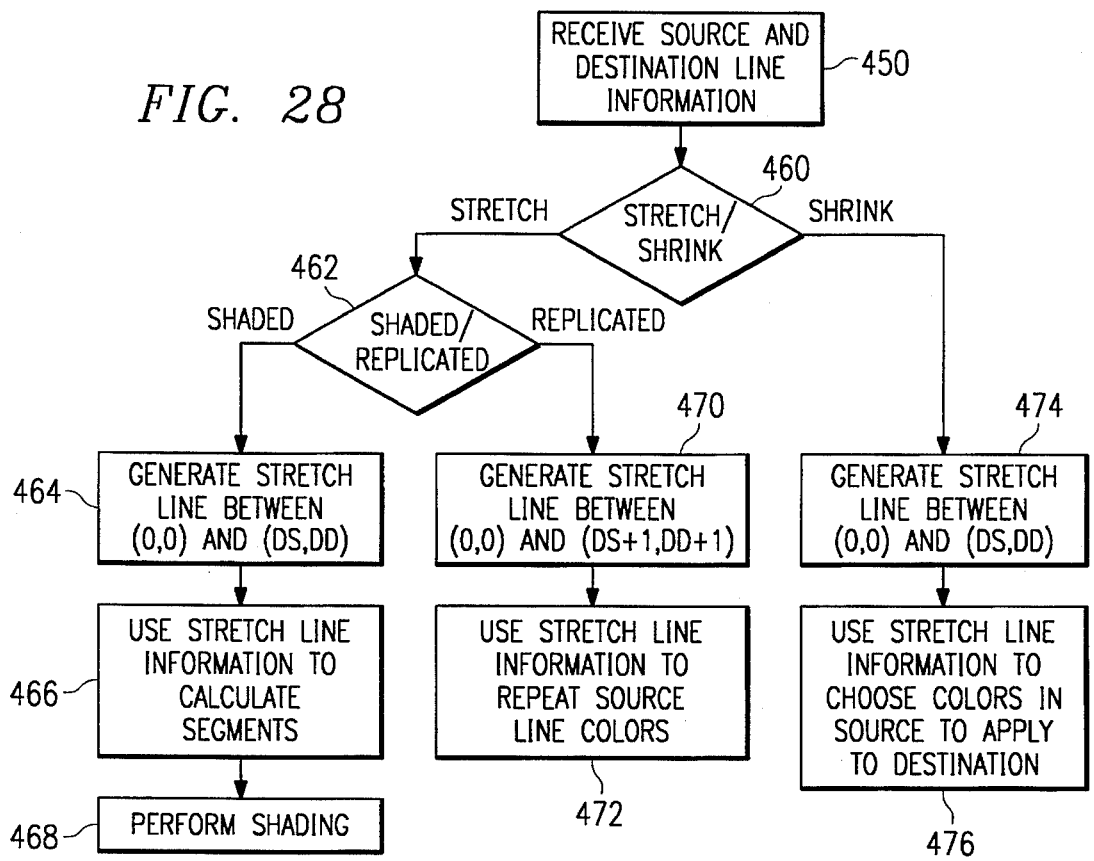
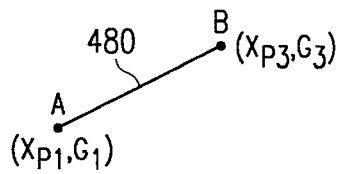
FIG. 29a
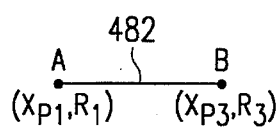
FIG. 29b
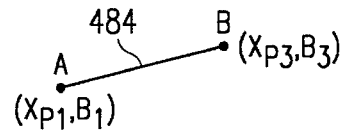
FIG. 29c
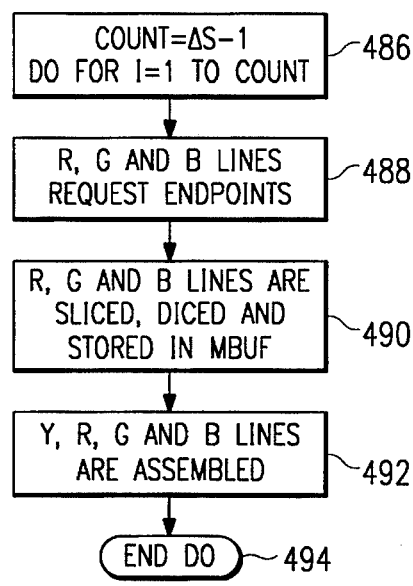
FIG. 30

RUN SLICE LINE DRAW ENGINE WITH NON-LINEAR SHADING CAPABILITIES

CROSS REFERENCE TO RELATED APPLICATIONS

This application is a continuation-in-part of U.S. Pat. App. Ser. No. 08/381,104, entitled "Run Slice Line Draw Engine with Enhanced Processing Capabilites" to Dao et al, al, filed Jan. 31, 1995. This application is further related to U.S. Pat. App. Ser. No. 08/380,972, entitled "Run Slice Line Draw Engine with Enhanced Line Configurations" to Dao, al, filed Jan. 31, 1995, U.S. Pat. App. Ser. No. 08/381,075, entitled "Run Slice Line Draw Engine with Look-Ahead Slice Capability" to Dao et al, al, filed Jan. 31, 1995, U.S. Pat. App. Ser. No. 08/380,967, entitled "Run Slice Line Draw Engine with Enhanced Clipping Techniques" to Dao et al, al, filed Jan. 31, 1995, U.S. Pat. App. Ser. No. 08/381,074, entitled "Run Slice Line Draw Engine with Stretching Capabilites" to Dao et al, al, filed Jan. 31, 1995, and U.S. Pat. App. Ser. No. 08/381,106, entitled "Run Slice Line Draw Engine with Shading Capabilites" to Dao et al, al, filed Jan. 31, 1995.

TECHNICAL FIELD OF THE INVENTION

This invention relates in general to computer graphics, and more particularly to a Bresenham run slice line draw engine with non-linear shading capabilities.

BACKGROUND OF THE INVENTION

In order to communicate with a user, a computer must be able to output information to a display. In a graphics system, the display is defined by an array of pixels. For example, in a standard-mode VGA (Video Graphics Adapter) system, the screen is addressed as an array of 640×480 pixels. Each pixel on the display may be set to a desired color. The color of each pixel on the screen is stored in a frame buffer. The colors may be directly specified in the frame buffer or specified by reference to a palette which stores color information for a predetermined number of colors. Typically palettes are used for color depths of 16 or 256 colors. When larger color depths are used, such as 32K or 16.7M (true color) color depths, each pixel location in the frame buffer stores data for the RGB (Red, Blue Green) components of each pixel. The number of pixels which may be displayed is defined by the graphic subsystem. Typical VGA modes support 640×480, 800×600, and 1024×768 resolutions. VGA modes with resolution greater than 640×480 are generally referred to as "Super VGA". The size of the frame buffer is therefore dependent upon the resolution and color depth of the display.

The speed at which a personal computer operates is dependent upon a number of factors. Naturally, the speed of the microprocessor has a significant influence on the speed of operation of the overall computer system. Next to processor speed, in many cases, the video graphics subsystem has the most influence on the performance of the overall computer system. This is particularly true when a graphical user interface, such as MICROSOFT WINDOWS (by Microsoft Corporation of Redmond, Wash.) is used. In order to boost performance, most modern day personal computers use either a local video bus (which has a higher data bandwidth than the main peripheral bus) and an accelerated graphics card which increases the speed of certain operations. An accelerated graphics card allows the graphics card to perform selected graphics operations at high speed, rather than using the CPU to perform the operation. Hardware acceleration improves the operation of the computer system in two ways: (1) the CPU no longer needs to perform low-level graphics operations handled by the graphics card and (2) the data bandwidth for certain operations is greatly reduced, resulting in less bus traffic.

In order for acceleration to increase the responsiveness of the system, the operating environment, such as WINDOWS, must know the capabilities of the accelerated graphics subsystem. When the operating environment is loaded, it initiates the loading of a graphics driver, which is a program which acts as an intermediary between the operating environment and accelerated graphics hardware (similarly, application software may have their own drivers to take advantage of acceleration features found in an accelerated video card). The driver passes parameters to the operating environment which specify the accelerated capabilities of the graphics subsystem. Thereafter, when the operating environment (or application) needs to perform a graphics operation which could benefit from one of the accelerated capabilities, it passes the necessary data to the driver. The driver interprets the information from the operating environment, processes the information and passes data via the bus to the graphics subsystem. The graphics subsystem then performs the graphics operation by writing data to its frame buffer.

Many of today's application programs are graphics intensive. For example, a computer-aided design program, such as AUTOCAD by AutoDesk, Inc., Sauseleto, Calif., may spend a substantial amount of time drawing a figure to the screen. In some cases, even a small change in the drawing will require the entire drawing to be redrawn. In this case, the ability of the graphics processor to draw lines quickly becomes of critical importance. In addition to the use of line drawing by applications, a graphics card's ability to draw lines may directly affect its other accelerated functions, such as block transfer of data, since the BLT (Bit Block Transfer) engine may use the line draw engine to perform the block transfer.

With regard to line drawing, many problems are addressed in an article "Ambiguity in Incremental Line Rastering", by Jack E. Bresenham, IEEE CG&A, May, 1987, which is incorporated by reference herein. The Bresenham article describes problems in drawing a line using an array of pixels, since lines having real values between two discrete pixels will have to be approximated using one pixel or the other. A speed improvement on this technique involves processing a Bresenham line as a number of segments. This technique is referred to as "run-slice" processing and is described in Jack E. Bresenham, "Run Length Slices for Incremental Lines", IBM Technical Disclosure Bulletin 22-8B, January 1980.

In other applications, manipulation of color information is very important. For example, some applications generate a continuum of colors between two color values (for a line) or three color values (for a triangular region). This operation is commonly referred to as "shading." Typically, the intermediate color values are computed by the CPU, which can significantly affect the responsiveness of the computer system. On the other hand, delegating responsibility of shading functions to the graphics card, while freeing the CPU, can seriously degrade the graphics card's ability to perform other functions.

Further, many programs, including game software, now make use of "three dimensional" (3D) graphics, where color manipulation of objects is used to provide the effect of a three dimensional object on the screen. Calculation of the 3D color information is processor intensive and therefore can significantly affect the responsiveness of the computer system.

While the speed and functionality of graphics cards has been steadily increasing, the demands of software requires even more graphics power. Accordingly, a need has arisen in the industry for a graphics processor which increases the speed at which information is displayed, particularly in connections with line draws, and performs complex graphical operations without requiring additional expensive hardware.

SUMMARY OF THE INVENTION

The present invention is operable to apply color to a destination line between a first endpoint of a first color and a second endpoint of a second color according to a desired non-linear function. For each component color, a shading polyline is generated as a plurality of linear segments. Each shading polyline is an approximation of the non-linear function associated with the component color, with the first endpoint of the polyline having a value associated with the value of the corresponding color component of the first endpoint of the destination line and the second endpoint of the polyline having a value associated with the value of the corresponding color component of the second endpoint of the destination line. Component color values for each location of the destination line are provided by mapping values from the segments of the polylines to locations of the destination line.

The present invention provides significant advantages over the prior art. The generation of the shaded lines can be performed rapidly without complex mathematical operations and without additional hardware.

BRIEF DESCRIPTION OF THE DRAWINGS

For a more complete understanding of the present invention, and the advantages thereof, reference is now made to the following descriptions taken in conjunction with the accompanying drawings, in which:

FIG. 18 illustrates a flow chart describing drawing of clipped lines using a combination of normal Bresenham and run-slice techniques;

FIG. 19 illustrates a flow chart describing concurrent generation run-slice parameters and output from the line draw engine;

FIG. 20 illustrates a flow chart describing concurrent generation repeat count parameters and output from the line draw engine;

FIG. 21 illustrates a chart showing operation of the serial divider to calculate partial repeat counts.

FIG. 22b illustrates an exemplary destination for a stretch operation using the colors of the source line of FIG. 22a;

FIG. 22c illustrates an exemplary destination for a replicated stretch operation using the colors of the source line of FIG. 22a;

FIG. 22d illustrates an exemplary destination for a shrink operation using the colors of the source line of FIG. 22a;

FIGS. 24a and 24b illustrate stretch and destination lines, respectively, illustrating a stretch operation in conjunction with the source line of FIG. 22a;

FIGS. 26a and 26b illustrate stretch and destination lines, respectively, illustrating a replicated stretch operation in conjunction with the source line of FIG. 22a;

FIG. 28 illustrates a flow chart describing the steps of a stretch or shrink operation;

FIG. 29a–29c illustrate of R, G and B color lines used for shading;

FIG. 30 illustrates a flow chart describing a shade operation;

DETAILED DESCRIPTION OF THE INVENTION

SYSTEM OVERVIEW

Figure 1:
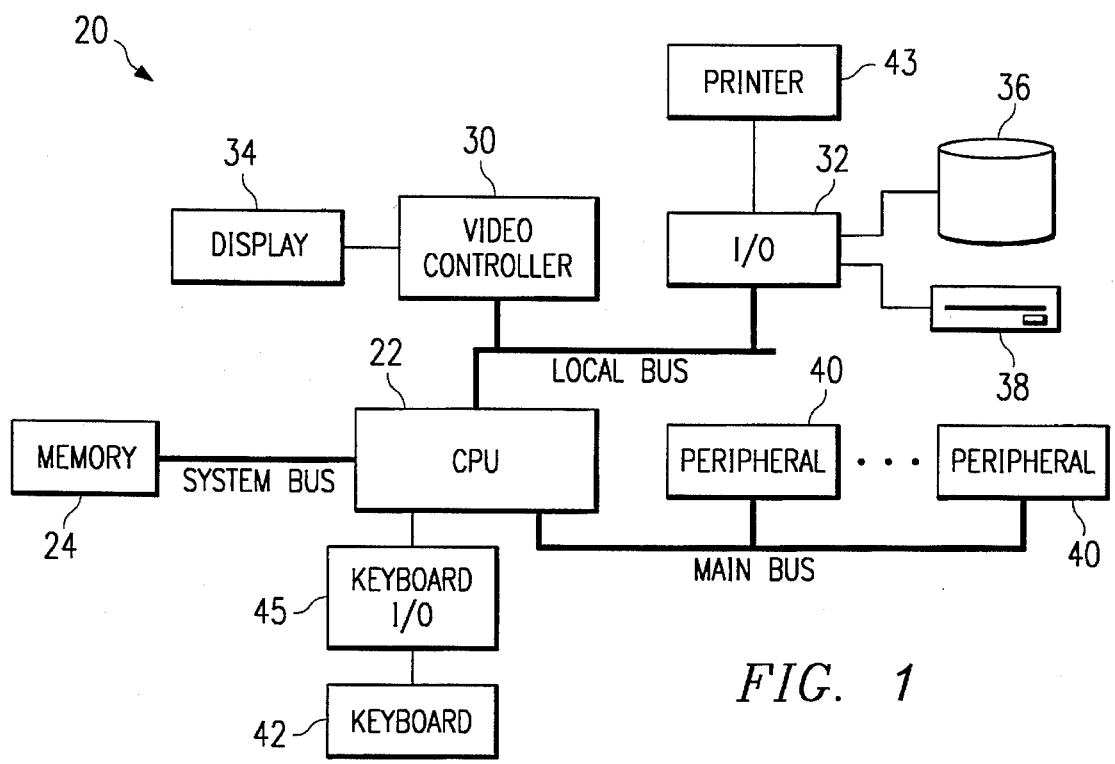
FIG. 1 illustrates a block diagram of a computer system.
Figure 2:
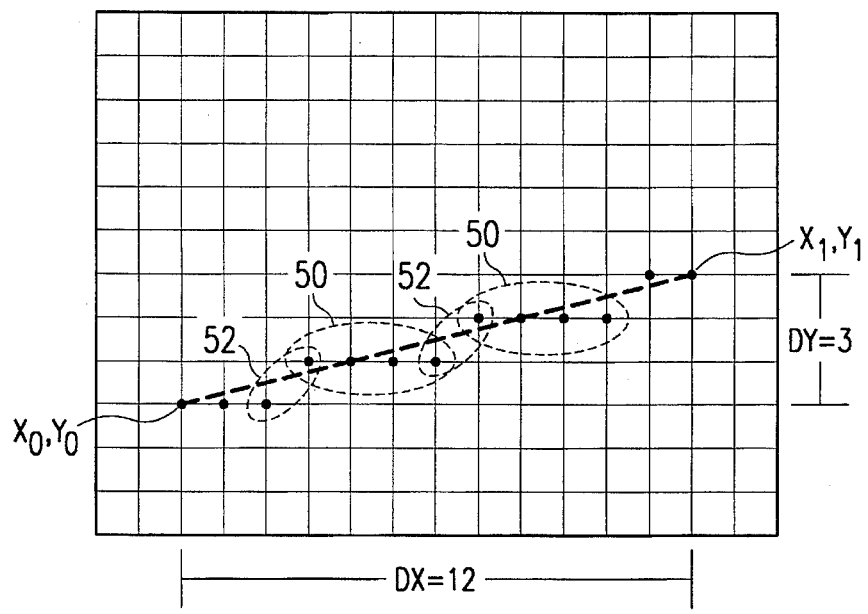
FIG. 2 illustrates an output of a run-slice line on a computer display.

FIG. 1 illustrates a block diagram of a computer system 20. The computer system 20 includes a microprocessor (or central processing unit) 22, coupled to memory 24, a local bus 26 and a main peripheral bus 28. A graphics controller 30 and I/O circuitry 32 are coupled to the local bus 26. A display 34 is coupled to the graphics controller 30. A hard disk 36 and floppy disk 38 are coupled to the I/O circuitry 32. A plurality of peripherals 40 are coupled to the main bus 28. A keyboard 42 is coupled to the CPU 22 through keyboard interface 45. A printer 43 is also coupled to I/O circuitry 32. The computer system 20 of FIG. 2 is an exemplary embodiment for a high performance computer system. Many computer systems vary from the architecture shown in FIG. 1, and the invention described herein would apply to various architectures. Further, the architecture shown in FIG. 1 is a basic architecture and many of the details have been removed for illustrative purposes.

VIDEO CONTROLLER OPERATION

Bresenham Lines

Importantly, the graphics controller 30 uses a run-slice line draw engine to greatly improve the performance of certain graphics functions, described in greater detail below. A run-slice line draw engine draws Bresenham lines at high speed. The method of drawing a Bresenham line is described in detail in J. E. Bresenham, "Algorithm for Computer Control of Digital Plotter," IBM Systems Journal, Vol. 4, No. 1 (1965), pp. 25–30, which is incorporated by reference herein. The technique for drawing a Bresenham line on a point-by-point basis (i.e., not using run-slice techniques) is widely used throughout the industry. FIG. 2 illustrates a Bresenham line drawn between arbitrary endpoints $X_0$, $Y_0$ and $X_1$, $Y_1$. Given the endpoints of a line, five variables are computed:

$$DX = X_1 - X_0$$

$$DY = Y_1 - Y_0$$

$$K1 = 2*DY - 2*DX$$

$$K2 = 2*DY$$

$$E_0 = 2*DY - DX$$

The following pseudo-code describes the process for selecting points between the endpoints to display the line:

```
E=E0
X=X0
Y=Y0
For I=1 to DX
        Set Pixel (X, Y, Color)
        If E=0
                THEN
                        Y=Y+1
                        E=E+K1
                ELSE
                        E=E+K2
        END IF
        X=X+1
END FOR
```

Figure 3:
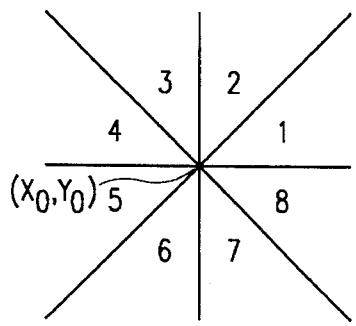
FIG. 3 illustrates a chart showing the octants used to classify a line.

The above technique is described for line having a slope which falls in the first octant (see FIG. 3). By convention, the definition is described for first octant lines and the technique can be applied to lines in the other octants as is well known in the art (and described in the Bresenham article cited above).

As can be see from FIG. 2 and the pseudo-code above, the Bresenham technique makes a decision at each point as to whether the next point of the line will be axial (i.e., along the major axis) or diagonal (i.e., incremented along both the major and minor axes). It should be noted that the pseudo-code described above results in an axial step if E=0. Alternatively, a diagonal step could be taken when E=0.

For an arbitrary point (XY), the true error between the point (X,Y) and a line between $(X_0, Y_0)$ to $(X_1, Y_1)$ can be given by the expression:

$$F(X,Y) = 2DY*(X-X_0) - 2DX*(Y-Y_0).$$

True error is proportional to the distance between (X,Y) and the line and has positive values on one side of the line and negative values on the other side of the line. True error is exactly zero when the point X,Y is on the line. The Bresenham error, E, at point (X,Y) is equal to the true error at point (X+1, Y+½). When Bresenham error is zero, the next axial and diagonal points are equally distanced from the line and the true error is at its maximum. By adding either K1 or K2 to the previously accumulated error, the error term indicates which move (axial or diagonal) is appropriate.

RUN SLICE GENERAL OPERATION

While the Bresenham technique described above is popular because a line can be defined at high speed using only addition and substraction to determine the Bresenham error, it is known that the Bresenham line can be computed by reference to constant direction slices of either solely axial or solely diagonal moves. See J. E. Bresenham, D. G. Grice and S. C. Pi, "Run Length Slices For Incremental Lines," IBM Systems Journal, Vol. 22, No. 8B (January 1980), which is incorporated by reference herein. As shown in FIG. 2, two full slices 50 are shown. In this case, the slices 50 are axial slices, i.e., all points in the slice are along the major axis, and diagonal corrections 52 are made between the slices 50.

Figure 4:
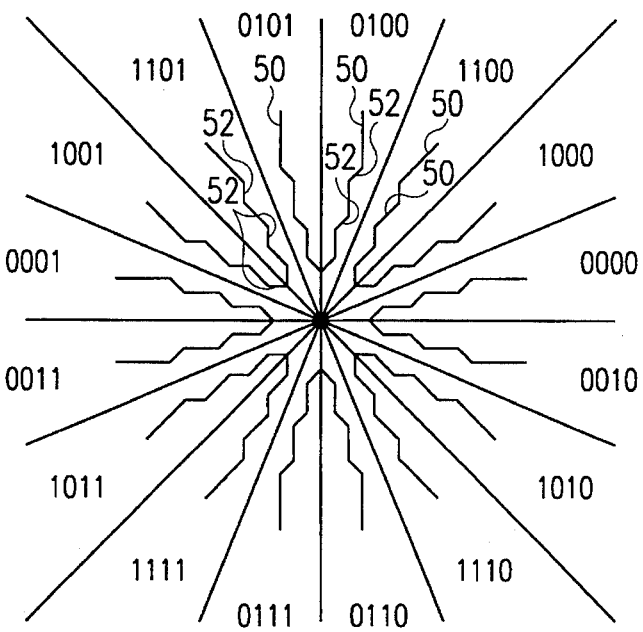
FIG. 4 illustrates a chart showing the half-octants and classifications for a line.

Accordingly, a line can be classified using one of sixteen codes, depending upon the half octant in which the slope of the line lies, as shown in FIG. 4. A line in the first half-octant (labeled "0000") has axial slices 50 aligned with the positive X axis, with diagonal corrections. A line in the second half-octant (labeled "1000") has diagonal slices 50 at a 45° angle with corrections along the positive X axis. A line in the third half-octant (labeled "1100") has diagonal slices at a 45° angle with corrections along the positive Y axis. A line in the fourth half-octant (labeled "0100") has slices along the positive Y axis with diagonal corrections at a 45° angle, and so on. Each of the sixteen line codes describe a line which is unique in the direction of the slices 50 and the direction of the corrections 52. In the preferred embodiment, line is assigned a half octant code as shown in Table I.

TABLE I

Half Octant Code

Bit 0 = 0 if (DX>=0) and = 1 otherwise
Bit 1 = 0 if (DY>=0) and = 1 otherwise
Bit 2 = 0 if |DX|>=|DY| and = 1 otherwise
Bit 3 = 0 if (2|DY|<=|DX|) or (2|DX|<=|DY|) = 1 otherwise Also in the preferred embodiment, all lines are transformed into the first half octant (code ="0000"). The transformation generates DX and DY for the line in the first half octant. These lines retain their original octant code and original endpoints as described in greater detail hereinbelow.

and line type (i.e., Bresenham, Full First or Points First). In block 66, the coordinates for each slice, and optionally, all points of the slice, are generated based on the starting point of the line and the slice length of each line. A more detailed explanation of the generation of the run-slice line information is set forth below.

Many display operations can be simplified into multiple lines. For example, to draw a solid polygon, lines representing the perimeter of the polygon can be calculated to determine the endpoints of a plurality horizontal lines which are drawn to create the filled polygon. Only the horizontal lines are actually written to the frame buffer.

RUN SLICE CALCULATIONS

Tables II, III and IV set forth the determination of the number of pixels of the slices for Bresenham, Full First and Points First lines, respectively. In these Tables, Q=(DX/DY) and R=MOD(DX, DY), i.e., R is the integer remainder of the DX/DY division.

NORMAL BRESENHAM LINES

For a normal Bresenham run-slice, the number of pixels and errors shown in TABLE II can be determined as follows:

TABLE 11

RUN-SLICE COMPUTATIONS NORMAL BRESENHAM LINE

| Slice | Slice Length | Error |
|---|---|---|
| | Axial When E = 0 | |
| First Run-Slice | Int(Q/2) + 1 | $E_0 = 2DY - 3R$ if Q even<br>$E_0 = DY - 3R$ if Q odd |
| Mid Run-Slices | Q if E < O<br>Q + 1 if E >= 0 | E = E + 2R<br>E = E + 2R - 2DY |
| Last Run-Slice | Int(Q/2) if Q even and R = 0<br>Int(Q/2) + 1 if Q odd or R < > 0 | N/A |
| | Diagonal When E = 0 | |
| First Run-Slice | Int(Q/2) if Q even and R = 0 | $E_0 = 0$ |
| | Int(Q/2) if Q odd or R < > 0 | $E_0 = 2DY - 3R$ if Q even and R < > 0<br>$E_0 = DY - 3R$ if Q odd |
| Mid Run-Slice | Q if E <= $0_1$ | E = E + 2R |
| Last Run Slice | Q + 1 if E*<br>Wt (Q/2) + 1 | E = E + 2R - 2DY<br>N/A |

Figure 5A:
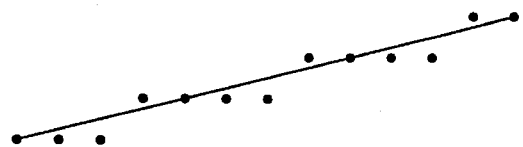
FIGS. 5a, 5b and 5c illustate normal Bresenham, Full First and Points First lines used in the preferred embodiment of the present invention.
Figure 5B:
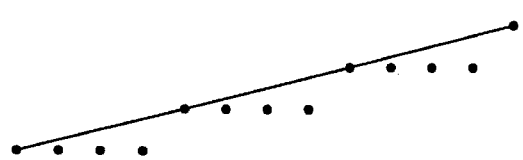
Figure 5C:
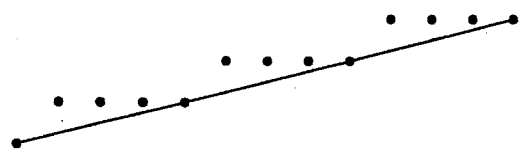

Also in the preferred embodiment, the video controller 30 is operable to draw three types of Bresenham lines using run-slice technique. The first line type, shown in FIG. 5a, is the normal Bresenham line. The second line type is a "Full First" line, shown in FIG. 5b. The third type of line, a "Points First" line, is shown in FIG. 5c.

The normal Bresenham line shown in FIG. 5a uses the normal Bresenham run-slice algorithm to draw lines with pixels closest to the ideal line. The Full First line shown in FIG. 5b draws a line between the endpoints in which all pixels are either on the line or to the right of the line (for lines in the first half octant). In a Points First line, all pixels are either on or to the left of the ideal line (for a first half octant line).

Figure 6:
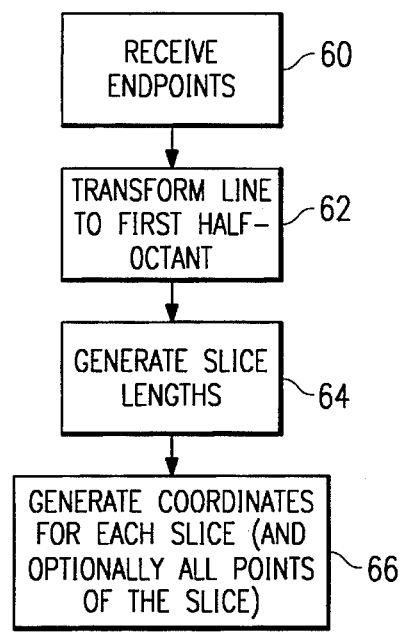
FIG. 6 illustrates a flow chart describing overall operation of the line draw engine with respect to drawing lines using a run slice technique.

FIG. 6 illustrates a flow chart describing the overall operation of the video controller 30 with regard to run-slice line drawing. In block 60, the endpoints of the line are received. Alternatively, other information, such as starting point, DX and DY could be used to define the ideal line. In block 62, the line is transformed to the first half octant. In block 64, the slice lengths are generated for the first slice, intermediate slices, and last slice, based on the endpoints First Slice Assuming a normal Bresenham line, stepping axially when the Bresenham error equals zero, the number of pixels of the first segment can be found at the smallest integer end where the error switches from negative or "0" to a positive number, since the Bresenham error is negative or "0" for all points in the first slice, except the last point.

| | E = 2DY - DX<br>+ 2nDY <=0 | Bresenham initial error<br>n axial steps to last point of first segment. |
|---|---|---|
| | n > (Dx-2DY)/2DY<br>n > (DX/2DY)-1 | axial step when E = 0 |
| Since | DX = Q*DY + R<br>n > Q/2 + R/2DY-1 | |

R/2DY-1 has values from -1 to -0.5 (excluding -0.5). In either case, smallest integer n is $n=Q/2$ Including the first pixel, the number of pixels for the first segment is $$L_0 = Q/2 + 1$$

Alternatively, if for a Bresenham line in which a diagonal step is taken when the Bresenham error equals zero, the number of pixels for the first slice can be computed as follows:

| | |
|---|---|
| $n \geq Q/2 + R/2DY - 1$ | |
| $n = Q/2$ | except when Q even and R=0 |
| $n = 0Q/2 - 1$ | when Q even and R=0 |
| $L_0 = Int(Q/2) + 1$ | except when Q even and R=0 |
| $L_0 = Int(Q/2)$ | when Q even and R=0 |

Mid Slices

To determine the number of pixels of the mid run-slices, suppose E is the Bresenham error term at the last point on a segment, the next segment length is the smallest n satisfying

| | | |
|---|---|---|
| | $E_{i+1} = E_i + 2nDY - 2DX \geq 0$ | (one diagonal step and (n-1) axial steps) |
| | $n \geq (2DX - E_i)/2DY$ | |
| Since | $DX = Q*DY + R$ | |
| | $n \geq Q + (2R - E_i)/2DY$ | |

Minimum integer n or length of the next segment is $Q$ when $2R - E_i < 0$ $Q+1$ when $2R - E_i \geq 0$ Assuming the next segment length is Q and calculating the error at last pixel of next segment, if it is positive, it is indeed the last pixel, if it is negative, it is not the last pixel, and the next segment length is Q+1

| | | |
|---|---|---|
| $E_{i+1}$ | = | $E_i + 2Q*DY - 2*(Q*DY + R)$ |
| | = | $E_i - 2R$ |

If $E_{i+1} > 0$, the next segment length is Q and the Bresenham error of the last pixel of the next segment is $$E_{i+2} = E_{i+1} - 2R \text{ if } E_{i+1} > 0$$

If $E_{i+1} \leq 0$, the next segment length is Q+1 and the Bresenham error at the last pixel of the next segment is adjusted to be $$E_{i+2} = E_{i+1} + 2DY$$

Hence the Bresenham error of the last pixel of the next segment is $$E_{i+2} = E_{i+1} + 2DY - 2R \text{ if } E_{i+1} \leq 0$$

Last Slice

To find the last run-slice length, the largest integer n is found which satisfies

| | |
|---|---|
| $E = 2DY - DX$ | Initial Bresenham error |
| $+2DY*DX - 2DX*DY$ | DY diagonal steps and (DX-DY) axial steps to last point |
| $-2nDY + 2DX$ | back track to last pixel of next to last segment |

| | |
|---|---|
| | $E > 0$ |
| | $n < (2DY + DX)/2DY$ |
| | $n < 1 + (DX/2DY)$ |
| Since | $DX = Q*DY + R$ |
| | $n < 1 + Q/2 + R/2DY$ |

The last segment length is

| | |
|---|---|
| $L = Int(Q/2) + 1$ | except when R=0 and Q even |
| $L = Int(Q/2)$ | when R=0 and Q even |

The length of the last run-slice when a diagonal step is taken when the Bresenham error equals zero can be determined as follows $$n \leq 1 + Q/2 + R/2DY$$

$$L = Int(Q/2) + 1$$

Initial run-slice estimated Bresenham error at last pixel of the 2nd segment can be computed as follows:

| | |
|---|---|
| $E_0 = 2DY - DX$ | Bresenham initial error |
| $+2*(Q/2)*DY$ | Bresenham axial steps to last pixel of 1st segment |
| $-2R$ | Estimated to last pixel of 2nd segment |
| $E_0 = 2DY - Q*DY - R + *(Q/2)*DY - 2R$ | |
| $E_0 = 2DY - 3R$ if Q even | |
| $E_0 = DY - 3R$ if Q odd | |

For Bresenham lines with a diagonal step when the Bresenham error equals zero, the initial run-slice error is determined as follows:

| | |
|---|---|
| When R=0, Q even | |
| $E_0 = 2DY - DX$ | Bresenham initial error |
| $+2*(Q/2-1)*DY$ | Bresenham axial stpes to last pixel of 1st segment |
| $-2R$ | Estimated to last pixel of 2nd segment |
| Ehd 0 = $2DY - Q*DY + Q*DY - 2DY$ | |
| $E_0 = 0$ | |
| When R ◊ 0 or Q odd | |
| $E_0 = 2DY - DX$ | Bresenham initial error |
| $+2*(Q/2)*DY$ | Bresenham axial steps to last pixel of 1st segment |
| $-2R$ | Estimated to last pixel of 2nd segment |
| $E_0 = 2DY - Q*DY - R + 2*(Q/2)*DX - 2R$ | |
| $E_0 = 2DY - 3R + 2*(Q/2)*DY - Q*DY$ | |
| $E_0 = 2DY - 3R$ | Q even |
| $E_0 = DY - 3R$ | Q odd |

FULL FIRST LINES

For Full First lines, the line lengths and errors can be computed as follows:

TABLE III

RUN SLICE CALCULATIONS FULL FIRST LUX

| Slice | Slice Length | Error |
|---|---|---|
| First Run Slice | Q if R = 0 | $E_0 = 0$ |
| Mid Run-Slices | Q + 1 if R < > 0<br>Q if E <= 0 | $E_0 = 4R - 2DY$<br>$E = E + 2R$ |
| Last Run Slice | 0 + 1 if E > 0<br>1 | $E = E + 2R - 2DY$<br>N/A |

First Slice

Since the starting point is on the line, it is the start of a slice. n axial steps are taken until the true error of the point diagonally above (this point is the start of the next slice) is positive or zero (crossing the ideal line).

$$E = 2n*DY \qquad \text{n axial steps}$$
$$-2DX + 2DY \qquad \text{diagonal step}$$
$$E = 2n*DY - 2DX + 2DY >= 0$$
$$n <= DX/DY - 1$$
$$n <= Q+R/DY-1$$
$$n = Q-1 \qquad \text{when } R=0$$
$$n = Q \qquad \text{when } R \diamond 0$$

Initial slice length is (including first pixel)

$$L_0 = Q \qquad \text{when } R=0$$
$$L_0 = Q+1 \qquad \text{when } R \diamond 0$$

Initial error is the true error of the diagonal point above the last point of the 2nd slice (or beginning of the 3rd slice)

$E_0 = 2*(Q-1)*DY$    Q-1 axial steps when R=0 to the end of the first slice
$+2DY - 2DX$    Diagonal step to beginning of 2nd slice
$-2R$    Steps to beginning of 3rd slice
$E_0 = 2*Q*DY-2DY+2DY-2*Q*DY-2R-2R$
$E_0 = 0$    when R=0
$E_0 = 2*Q*DY$    Q axial steps when $R \diamond 0$
$+2DY - 2DX$    Diagonal step to beginning of 2nd slice
$-2R$    Steps to beginning of 3rd slice
$E_0 = 2*Q*DY + 2DY - 2*Q*DY - 2R - 2R$
$E_0 = 2DY - 4R$    when $R \diamond 0$ Mid slices $E_i$ is the true error at the beginning of a slice, Q-1 axial steps is taken, the error at the diagonal point from this point is $$E_{i+1}=E_i+2*(Q-1)*DY-2DX+2DY$$

$$E_{i+1}=E_i+2*(Q-1)*DY-2*Q*DY-2R+2DY$$

$$E_{i+1}=E_i-2R$$

If $E_{i+1} \geq 0$, the diagonal point crosses the ideal line and the slice length is $$L=Q$$

$$E_{i+1}=E_i-2R$$

If $E_{i+1}<0$, the diagonal point has not crossed the ideal line and the slice length is $$L=Q+1$$

$$E_{i+1}=E_i-2R+2DY$$

Note that the special initial slice is not necessary if the first error term is calculated as $$E_0=-2R$$

and the subsequent slice formula is used.
This would give the initial length of Q if R=0 and the next error of E=0, initial length of Q+1 if R<>0 and next error of E=2DY-4R.

Last slice

Since the ending point is exactly on the line, it is the start of the last slice and also the end and hence the length is $$L=1$$

POINTS FIRST LINES

For Points First lines, the lengths and errors can be computed as follows:

TABLE IV

RUN SLICE CALCULATIONS POINTS FIRST LINE

| Slice | Slice Length | Error |
|---|---|---|
| First Run Slice | 1 | $E_0$ 2R − 2DY |
| Mid Run Slices | Q if <0 | E = E + 2R |
|  | Q + 1 if E >= 0 | E = E + 2R − 2DY |
| Last Run Slice | Q | N/A |

First slice

The starting point is exactly on the line, hence it is the last point of the slice, so the first slice length is $$L_0=1$$

Initial error is the true error of the axial point next to the last point of the 2nd slice (or point below the beginning of the 3rd slice)

$E_0 = 2DY - 2DX$    Diagonal step to beginning of 2nd slice
$-2R$    Steps to beginning of the 3rd slice
$+2DX$    Back to point below
$E_0 \;' 2DY - 2R$ Mid Slices $E_i$ is the true error at the axial point next to the last point of a slice, a minor step and Q subsequent axial steps is taken, the error at the point is $$E_{i+1}=E_i-2DX+2*Q*DY$$

$$E_{i+1}=E_i-2*Q*DY-2R+2*Q*DY$$

$$E_{i+1}=E_i-2R$$

If $E_{i+1}>0$, this point is the axial point next to the last point of the next slice and hence the next slice length is $$L=Q$$

$$E_{i+1}=E_i-2R$$

If $E_{i+1} \leq 0$, this point is the last point of the next slice and hence the next slice length is $$L=Q+1$$

$$E_{i+1}=E_i-2R+2DY$$

Last slice

Since the ending point is exactly on the line, it is the end point of the last slice, and the formula for subsequent slices above should apply for the last slice (the error of the axial point next to the ending point is 2DY, so the last slice length should be Q).

REPEAT COUNTS

Figure 7:
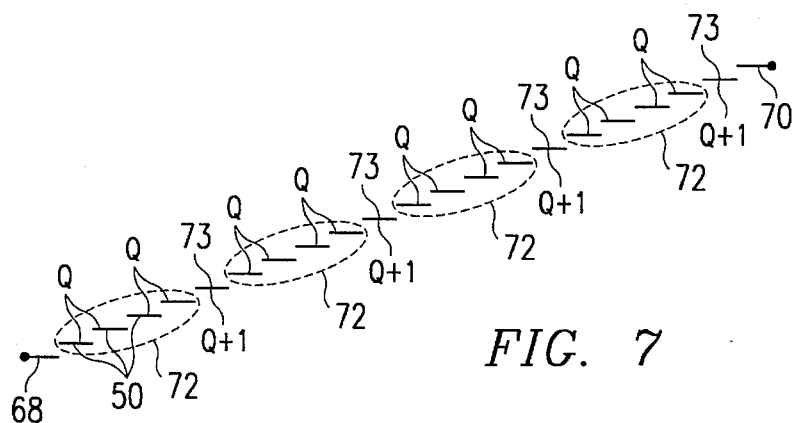
FIG. 7 illustrates a line formed of groups of slices.

As shown in FIG. 7, each line can be defined as a first slice 68, and last slice 70 and one or more groups 72 of mid slices 50 followed by a single slice 73. Each group 72 of mid slices 50 comprises either (1) one or more slices of length Q, followed by a single slice of length Q+1 or (2) one or more slices of length Q+1, followed by a single slice of length Q. The number of liked-size slices in a group is defined herein as RC. As shown in FIG. 7, RC=4, since each group 72 has four slices of length Q followed by a single slice of length Q+1.

The like-size slices will have a length as defined above. For example, with reference to Table II for normal Bresenham lines, if E<0, the group 72 will include one or more slices of length Q, followed by a slice of length Q+1. If E>0, the group 72 will include one or more slices of length Q+1, followed by a slice of length Q. If E=0, the slice length of the slices in group 72 is Q if a diagonal is step is taken when E=0 or Q+1 if an axial step is taken when E=0.

To determine the repeat count, the error at the last pixel of the previous slice, E, is divided by either K1 (if E<0) or K2 (if E>0), where K1 is set to 2*R and K2 is set to 2*R2*DY to determine the point at which E will change signs. Hence, to compute the repeat count, RC=abs(int(E/K))+1, where K=K1 if E<0 and K=K2 if E>0, except in the following cases. If E=0, RC is set to one. In the event that mod(E/K)=0 (i.e., the division E/K has a remainder of zero), then RC=abs(int(E/K)) if E<0 and the line is being drawn with an axial step when E=0 or if E>0 and the line is being drawn with a diagonal step when E=0.

After the group 72 of RC slices, the error, E, is updated to E=E+RC*K, where K=K1 if E<0 and K=K2 if E>0. If E=0, K=K1 if an axial step is taken when E=0 or K=K2 if a diagonal step is taken when E=0. The new error forces the next slice to have a repeat count of one and a length as described above.

The use of repeat counts can greatly increase the speed in generating a line. After calculating Q and RC and updating E, the slice information for a plurality of slices may be known without further calculations.

GRAPHICS CONTROLLER HARDWARE OVERVIEW

Figure 8:
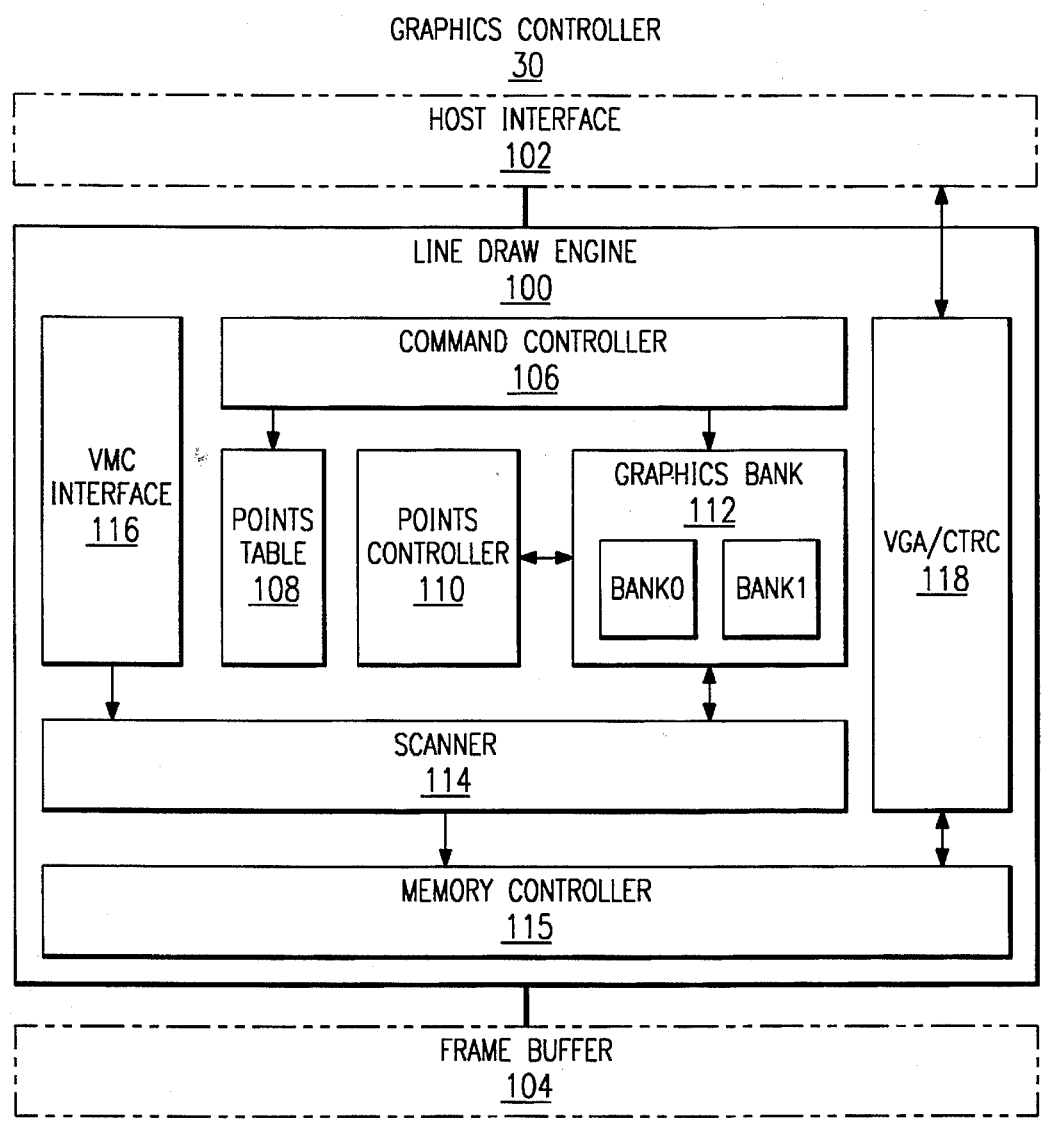
FIG. 8 illustrates a block diagram of the video controller of FIG. 1.

Referring now to FIG. 8, a block diagram illustrates the major units of graphics controller 30. In graphics controller 30, line draw engine 100 is connected to host interface 102 and frame buffer 104.

In operation, the line draw engine 100 communicates with the system of FIG. 1 through host interface 102. The host interface sends drawing commands and data, such as data to define a line, to command controller 106. The command controller 106 decodes instructions and data received from the host interface to draw lines. As described below, the command controller includes a polygon decomposer which decomposes a polygon into edge lines for determining endpoints for fill lines. In the preferred embodiment, the command controller 106 also has the capability of decomposing text to lines.

Command controller 106 may receive (1) the coordinates of the endpoints of a line or (2) the coordinates of one endpoint and DX and DY to define a line. The line information may also come from other units in line draw engine 100, such as the dicer 122. Once received, the command controller 106 generates configuration information which indicates how to process each line, where the line's endpoints are located and whether the line is "active" (ready for an operation). The configurations are programmable to ensure that the line draw engine architecture is flexible. In the preferred embodiment, the line draw engine separately stores configuration data for a plurality of lines which it processes concurrently. For example, configuration information for sixteen lines could be stored in various locations throughout the line draw engine 100. Each unit then arbitrates between the available lines to determine which is ready for processing, typically in a round-robin fashion.

During an operation, the points of a line are stored in the points controllers points table. When another unit of the line draw engine 100 needs a point, the unit requests the point from the points controller 110. The points controller arbitrates requests using a round-robin scheme and collects the points from the other units, such as the command points memory 108 and the command controller 106. When the requested data is available, the points controller delivers the data and acknowledges the associated requester. If points controller 110 is accessing data for a request, and a new request for the same data is made, points controller 110 answers the first request, but refuses the second request in order to keep proper track of point transactions.

Figure 9:
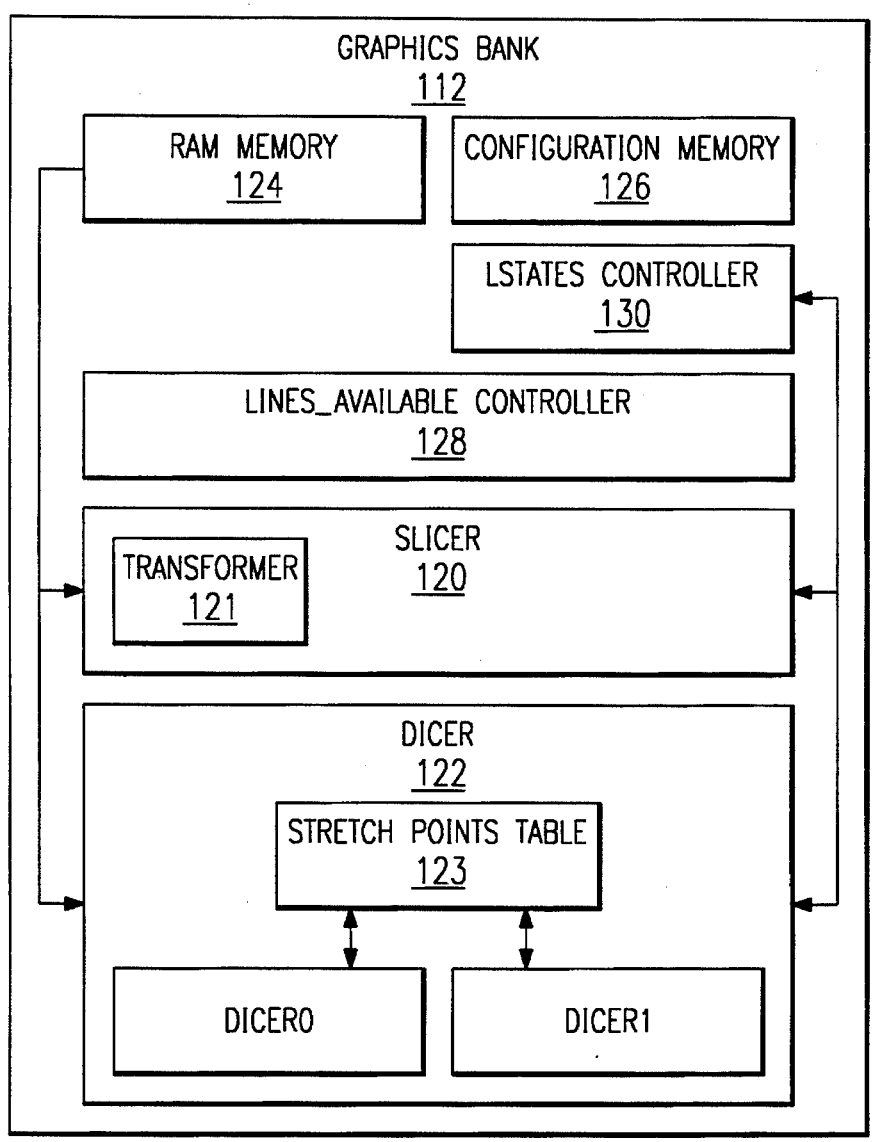
FIG. 9 illustrates a block diagram of a graphics bank shown in FIG. 8.

The line draw engine 100 further includes at least one graphics bank 112 and optionally comprises multiple graphics banks 112 shown in FIG. 7 as bank0, bank1, ... bankn. To reduce hardware, only a certain number of banks are implemented and are shared to service all lines. The number of banks is selected to provide sufficient performance for frequently used operations. Each bank is identical and has one slicer and one or more dicers (two dicers are shown in the embodiment of FIG. 9) that output points for slices. One of the graphics banks 112 is described in further detail below with reference to FIG. 8. For ease of description, the illustrated implementation uses a single graphics bank. At the completion of an operation, graphics bank 112 either indicates that the points of a slice are to be drawn by marking a data register or indicates that the points of the slice are to be used in another operation (e.g., as endpoints for fill lines).

Scanner 114 constantly scans graphics bank 112 for the slices to be drawn. The scanner retrieves the points of the slices and writes the address of the points in frame buffer 104. Scanner 114 also retrieves necessary data to facilitate a scan operation corresponding to the point such as RGB values, scan length and pitch. In the present embodiment, the scanner can perform operations on four simultaneous slices by allocating each slice to a memory channel buffer. The necessary data to facilitate a memory scan operation are also allocated to the memory channel buffer. As the memory channels become ready to be executed, Scanner 114 arbitrates these channels in a round robin fashion. The scanner can store one slice from a multiple number of slices of a line before the other slices are calculated or, in another embodiment, store a partial slice while the length of the slice is being calculated. Thus, information on partial slices can be stored in the frame buffer 104 and displayed during calculation of a slice length to increase the speed of the line draw engine 100.

The memory controller 115 takes the address and pixel data from the scanner and generates the signal to read and write to the frame buffer 104.

The line draw engine 100 also includes VMC Interface 116 and VGA/CTRC 118. VMC Interface 116 allows other subsystems, such as a full-motion video subsystem to access the frame buffer 104. VGA/CTRC handles VGA commands for DOS and text mode.

FIG. 9 illustrates graphics bank 112 in more detail. Each of the multiple graphics banks 112 can be identical to the one depicted in FIG. 9. Graphics bank 112 comprises a slicer 120 and a dicer 122.

The slicer 120 generates slice lengths and slice length repeat counts for a line, as described above. The slicer 120 is illustrated in more detail with reference to FIGS. 14–16. In general, there are three stages to the slicer 120. The first stage arbitrates to see which line is ready to be sliced, i.e., it looks for lines which have been transformed into the first octant and not yet sliced. Depending on whether the line has been sliced for the first time, the first stage collects either DX, DY or saved intermediate terms. The first stage also collects the line options which define how the line is to be drawn (e.g., Bresenham, Full First or Points First, among other options). The second stage performs the calculation to determine the slice length and the repeat count, as described above. This calculation requires a division, which in the preferred embodiment is performed using a serial division circuit, which provides the quotient as a stream of bits, with the most significant bits output first. During the serial division step, the serial stream of quotient bits can be used to generate partial slice lengths so that the line can be processed by subsequent stages immediately, concurrent with the remaining division function. If the line has been sliced before, the second stage calculates the next slice length and its repeat count. The third stage stores the results of the calculations—the slice length and its repeat count, as well as intermediate results for the next slice calculation, such as the error terms and the slice counts.

For each slice requested by the dicer 122, the slicer 120 sends the slice length and decrements the repeat count. When the repeat count equals "0", the status flag associated with the line is changed to indicate that the line needs to be sliced again and the next RC is calculated.

When the slicer completes an operation, the dicer 122 generates points for the points controller 110 or slices for the scanner 114. Slices generated by the dicer 122 may be communicated to scanner 114 to be stored in frame buffer 104 or points may communicated to other units, such as the points controller 110 to be used in other operations. Dicer 122 is divided into two dicers, dicer0 and dicer1. The two dicers operate in parallel, on alternate slices, to generate points for up to eight slices per dicer, in the present embodiment. Dicer 122 also comprises multiple stretch buffers 123 which store slice lengths and octant codes for stretch lines during a scaling operation as described with further detail below.

Each dicer 122 also has three stages. The first stage arbitrates to determine which slice is ready to generate a point. The second stage calculates the output data for the slice or point. The third stage stores the point or slice. Dicer0 is explained in further detail below.

Graphics bank 112 also comprises various memories for storing configurations for lines, including RAM memory 124 and configuration memory 126. RAM memory stores slice data and line data for each of the sixteen lines. Configuration memory 126 stores configurations for the sixteen lines as set by the command controller. Table V lists various configurations stored by configuration memory 126 and their description.

TABLE V

Configurations stored by Configuration Memory 260

| Configuration | Description |
|---|---|
| PT0 | The Line Draw Engine unit where the first point or delta for a line can be obtained |
| PT1 | The Line Draw Engine unit where the second point for the fine can be obtained |
| Reversible | Indicator to draw line reversibly |
| SOPTION | Slicing option (Bresenham, full-slice first, pixel first) |
| Partial_Slice | Indicator to generate partial slices |

Lines_Available controller 128 tracks the availability of each line. For example, when a unit requests a point from a line, Lines_Available controller 128 indicates whether lines are busy or available for processing by the requester.

LStates controller 130 is a high level controller for slicer 120. LStates controller 130 tracks each of the sixteen lines and stores the status of each line. For example, LStates controller indicates when a point is needed to complete an operation on a line, whether a line has been transformed to the first half octant, whether a line needs slicing, and whether the first slice is partial or full.

LStates controller 130 has two pipelined stages. The first stage tracks requests for end-points based on the configuration information and requests the line to be transformed to the first half octant when both end points are received. The second stage tracks when a line is ready to be sliced and further tracks what type of slice was generated. When a slice is taken by the dicer, this stage requests slicing for the next line.

ADVANCED LINE DRAW FUNCTIONS

In the preferred embodiment, the line draw engine 100 performs a plurality of functions by reducing the functions to a series of line operations. The functions supported include, for example, bitblts, polygon fills, replicated stretch/shrink blts, rectangular stretched/shrink bits, and so on. The application of the line draw engine to a simple polygon fill is described below in connection with FIGS. 10–13.

Figure 10:
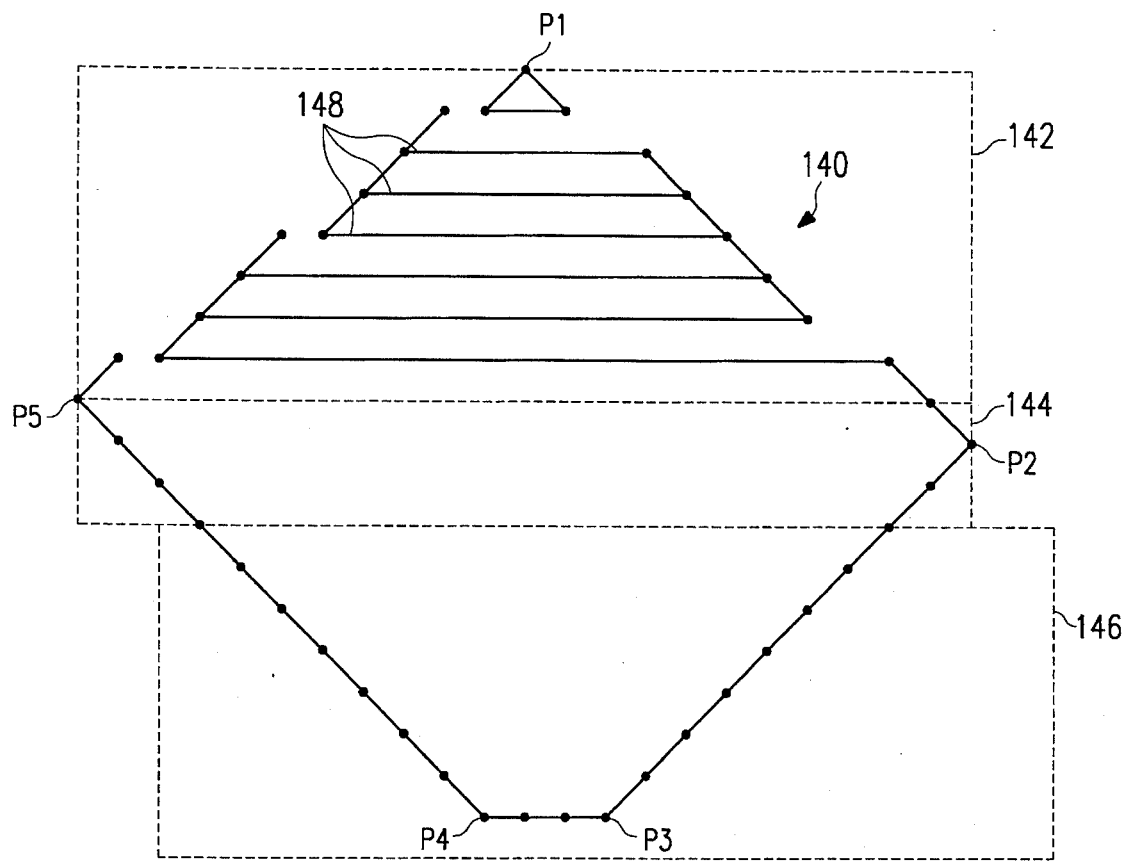
FIG. 10 illustrates use of the line draw engine to perform a polygon fill.

As shown in FIG. 10, a polygon to be formed is defined by vertices P1–P5. The polygon 140 is broken into three sections, 142, 144 and 146, where each section defines an area of the polygon bounded by two sides. To fill the polygon, fill lines (or "scan" lines) are drawn between the points defining two sides.

Using section 142 as an example, the dicer 122 can be used to generate the sides between P1 and P5 and between P1 and P2. Instead of using the points to write to the frame buffer 104, however, these points are used as the endpoints for horizontal scan lines 148 to be drawn between the sides of the polygon 140. The dicer can generate points for a line in accordance with the number of options. Referring to FIG. 10, it can be seen that the generation of the sides may result in more than one point for either or both endpoints of the horizontal line 148 at the point where a new slice begins. Consequently, the dicer will generate points for a line in accordance with line options which may be chosen for each line (the line options are stored in configuration registers).

Figure 11A:
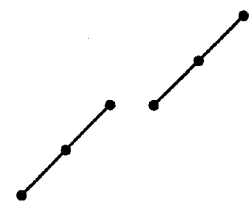
FIGS. 11a, 11b and 11c illustrate lines comprising all points, leftmost points and rightmost points, respectively.
Figure 11B:
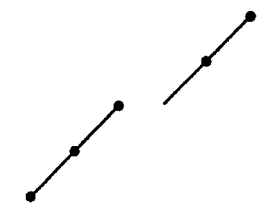
Figure 11C:
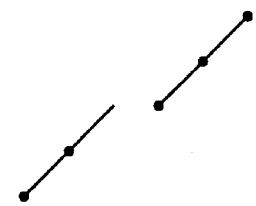

FIGS. 11a–11c show three types of lines which may be generated for a polygon side. In FIG. 11a, SIDE equals "00" is chosen to generate all points in the line which defines the edge of the polygon. In FIG. 11b, the SIDE equals "01" option is chosen in which the dicer 122 picks only the lea-most point per scan. In FIG. 11c, the SIDE equals "10" option is picked where the dicer 122 picks only the right-most points per scan.

When lines define the right and left edges of polygons, more options are available to the dicer to decide how to draw scan lines. SKIPFIRST and SKIPLAST instruct the dicer 122 to skip the first and last points of a line, respectively. If SKIPFIRST and SKIPLAST are both active for a line, then the dicer 122 generates points for the scan line with its endpoints within the edges of the polygon.

Figure 12:
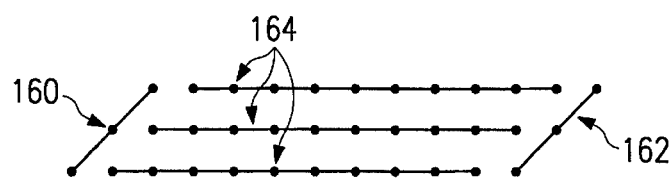
FIG. 12 illustrate a polygon fill using lines with the SKIPFIRST and SKIPLAST options for the scan lines.
Figure 13:
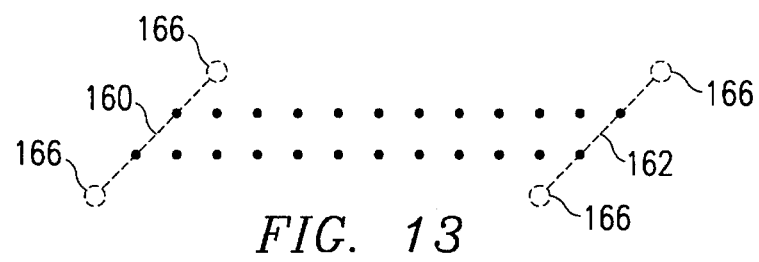
FIG. 13 illustrate a polygon fill using lines with the SKIPFIRST and SKIPLAST options for the edge lines.

FIG. 12 illustrates an example of a fill where the dicer 122 generates coordinate data for edges 160 and 162 and the points of the edges 160 and 162 are to be used to determine the endpoints of the scan lines 164. The scan lines 164 have the SKIPFIRST and SKIPLAST option active so the endpoints defined by the edges 160 and 162 are skipped in drawing the scan lines.

Similarly, the SKIPFIRST and SKIPLAST options can be used for an edge line of a polygon so that the dicer 122 will not generate the first and last points of an edge shown at 166 and, consequently, the scan lines associated with the first and last points of the edge will not be drawn.

By combining SKIPFIRST, SKIPLAST, SIDE equals "01" (pick left) and SIDE equals "10" (pick fight), polygons can be drawn so that no overlapping occurs when two polygons share the same edge.

In an exemplary embodiment, the engine has sixteen "slots" for lines. Each slot contains the configuration data to tell the line draw engine how to draw the line, for example, where to get the line's endpoints (from the command controller 106 or from the points controller 110) or how to use the line (e.g., to draw to the display or to use as a set of endpoint for another graphics function).

To draw a filled polygon, only 3 lines need to be active. The vertices of the polygon are given to the command controller 106 in clockwise order. The command controller 106 puts these points into its point table and configures the graphics bank 112 (including the transformer 121, slicer 120 and dicer 122) for the polygon's options. Three lines are set active in the graphics bank 112. Two edge lines are configured to be sources and are not configured to be drawn. This is done by setting the edge line's LTYPE code=00001 (normal intermediate destination). The third line is configured to get its endpoints from the two edge lines and is configured to be drawn (LTYPE code=00100–normal destination scanner line).

Next, the command controller 106 sends configuration information to its polygon decomposer. This information tells the polygon decomposer to get points from the command controller's point table. The polygon decomposer gets these points by raising a request to the points controller 110. The points controller 110 sends the polygon decomposer an acknowledge and then the polygon decomposer sends the address of the requested point. The points controller uses the address to retrieve the point data from the command controller's point table and writes the point data back to the polygon decomposer's point table. In general, whenever a module needs a point that is generated from another source (i.e. one line's endpoints come from another line's edge points), the module makes its request to the points controller 110. The points controller 110 uses the address of the requested point to fetch the data and then sends the data to the module that made the request.

The polygon decomposer finds the top and bottom vertices of the polygon. From these top and bottom vertices, the left and right edges of the polygon are found. The fight edges are those edges that are crossed when the polygon decomposer starts at the top vertex and proceeds, in clockwise order, to the bottom vertex. The left edges are crossed when the polygon decomposer starts at the bottom vertex and proceeds, in clockwise order, to the top vertex.

The graphics bank 112, which requests points for the edge lines, finally receives point data (through the points controller 110) for the current edges. These edges get diced and the dicer 122 generates two edge points which are stored in the dicer 122's point table. The dicer 122 will not generate another point for the edge line until the first point has been used by the third horizontal scan line. The horizontal scan line, which has been requesting its endpoints from the points controller 110, thus gets its endpoints as the dicer 122 generates the edge points. The two edge points used for the horizontal scan line 148 are flagged as used once the horizontal scan line is generated. Each horizontal scan line 148 is sent through the transformer 121 and the slicer 120. When the dicer 122 receives the line, it realizes the line is horizontal (a scanner slice). The dicer 122 puts all scanner slices into the points table of dicer 122 so the scanner 114 can read the slices and put them to memory. To distinguish points from slices, the point table of dicer 122 has a length entry that is set to a non-zero value for slices.

After the two edge points are flagged as used, two new edge points are generated by the dicer 122 for another horizontal scan line 148. This process repeats until a right or left edge line is used up. When the edge line is used up, this line requests another edge point from the polygon decomposer.

GRAPHICS BANK

Slicer

Figure 14:
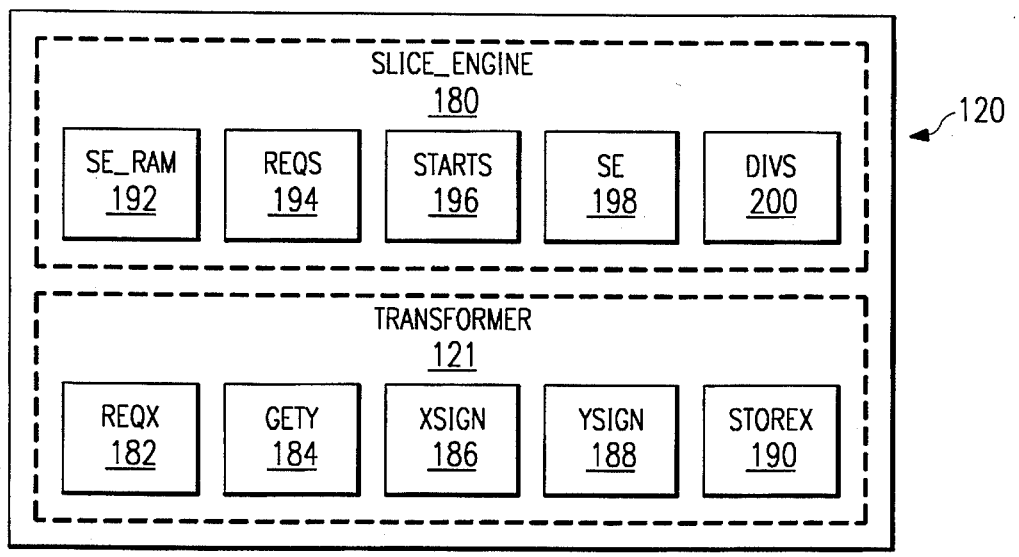
FIG. 14 illustrates a block diagram of the slicer shown in FIG. 8.

The bank 112 will now be discussed in greater detail. FIG. 14 illustrates a block diagram of the slicer 120 which comprises transformer 121 and slice engine 180. The transformer 121, as described above, forms three functions. First, it determines DX and DY from the line information (e.g., the coordinates of two endpoints). Second, it assigns a code in accordance with the half octant in which the line lies (see FIG. 4). Third, the transformer 121 transforms the line into the first half octant.

The transformer 121 comprises five pipeline stages: REQX 182, GETY 184, XSIGN 186, YSIGN 188, and STOREX 190. REQX 182 is the arbiter which selects lines on a round robin basis. The arbiter reviews status flags associated with each of the sixteen lines and determines which lines are ready to be processed (i.e., which lines have all data necessary to generate the line). When a line is ready, GETX 180 retrieves the X coordinates from the line information. GETY 184 retrieves the Y coordinates from the line information. XSIGN 186 calculates the sign of DX (positive or negative) and YSIGN 188 calculates the sign of DY. STOREX 190 stores the octant code for the line, calculates and stores DX and DY and transforms the information such that the line lies in the first half-octant. STOREX 190 then sets the status flags associated with the line to indicate that it is ready for slicing. If the line is defined by an endpoint, DX and DY, then the transformer determines the coordinates of the other endpoint.

The slice engine 180 has a memory SE_RAM 192 and five pipeline stages: REQS 194, STARTS 196, SE 198, DIVS 200 and CALQ 206. SE_RAM 192 stores all results and intermediate working variables for each line, such as E, K1, K2, slice_and slice count. REQS 194 is the arbiter which determines which line will be taken next for slicing. The arbiter 194 scans through the status flag for each line in round robin fashion to select a next line for slicing. A new line (a line which has not undergone any slicing) is ready when it has been transformed by the transformer 121. Lines which have had a slice taken by the dicer 122, but are not yet finished, return to the round robin queue for further processing by the slicer.

Figure 15:
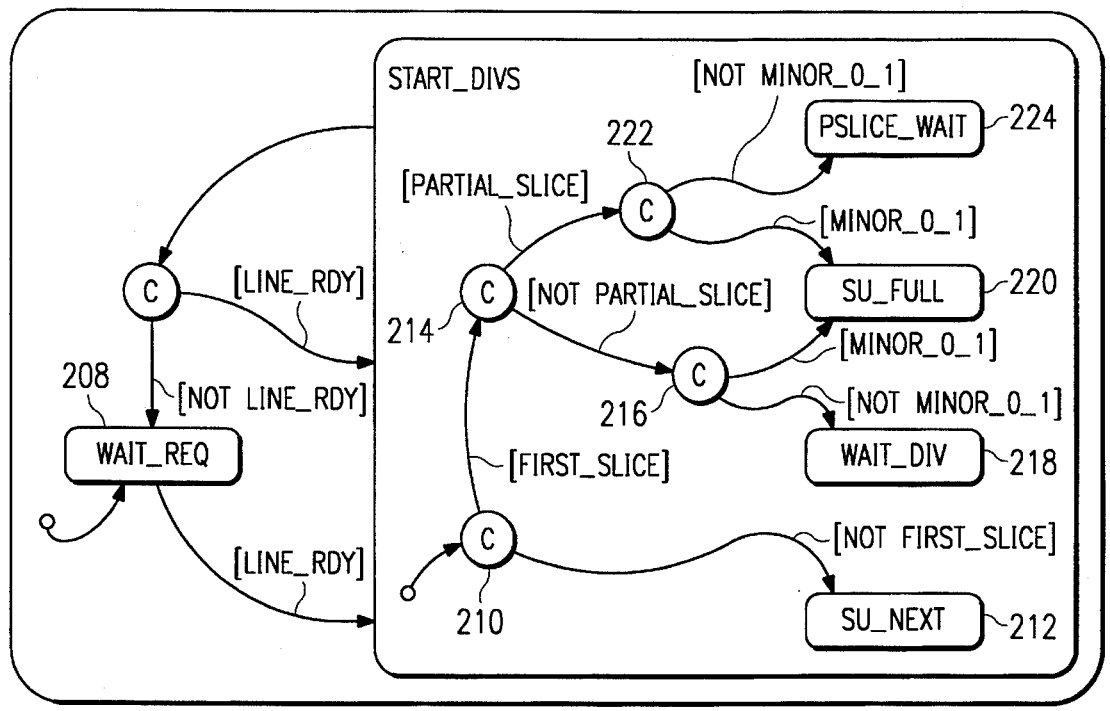
FIGS. 15 and 16 illustrate state diagrams describing operation of the slicer.

STARTS 196 is a state machine which determines what type of slice is required by the slicer and initiates the division process. A state diagram showing the operation of STARTS 196 is shown in FIG. 15. STARTS 196 remains in the WAIT_REQ state 208 until REQS 194 has found a line which needs slicing and has placed the appropriate data into a configuration register for the slicer 120. When a line is ready (LINE_RDY=true), the state transfers to the START_DIVS block where it enters at condition node 210. From condition node 210, if the configuration information on the line indicates that it is not at the first slice (for example, if the middle or less slice is being processed), the SU_NEXT state 212 is entered. The SU_NEXT state 212 sets the code to indicate that the slice being processed is not the first slice. Otherwise, if FIRST_SLICE=true, condition node 214 is entered which determines whether the slice being processed is a partial slice or a full slice. If it is not a partial slice (PARTIAL_SLICE=false) condition node 216 is entered. If DY=0 or DY=1, then MINOR_0_1=true, otherwise MINOR_0_1=false. If MINOR_0_1 is false, then the WAIT_DIV state 218 is entered. STARTS 196 remains in the WAIT_DIV state until the division is done, since the division on DX/DY will take several clocks to complete. Thus, the slice engine pipeline is stalled until the division is done. On the other hand, if MINOR_0_1 is true, then the division is trivial and the quotient can be determined in one clock in the SU_FULL state 220.

Referring back to condition node 214, if PARTIAL_SLICE is true, then in condition node 222, if MINOR_0_1 is true, a full slice will be ready in one clock cycle in SU_FULL state 220 (even though a partial slice was requested). On the other hand, if MINOR_0_1 is false, a partial slice will be ready in state 224 after one clock period.

After the appropriate state 212, 218, 220 or 224 is finished, the START_DIVS block is left. At condition node 226, if another line is ready, the flow returns to START_DIVS; otherwise, STARTS 196 returns to the WAIT_REQ state 208.

SE 198 sets flags indicating the type of slice being processed (i.e., a partial slice, a full slice or a "special" full slice where DY=0 or DY=1) and tracks the state of the slice going through the slice engine. If the current slice is not the first slice, then SE 198 recognizes that the calculation being performed concerns the repeat count. SE 198 stores the result of the division.

DIVS calculates the next numerator or next error term, along with calculating the partial quotient or the slice length and the accumulated quotient or slice count. A state diagram is given for DIVS 200.

Figure 16:
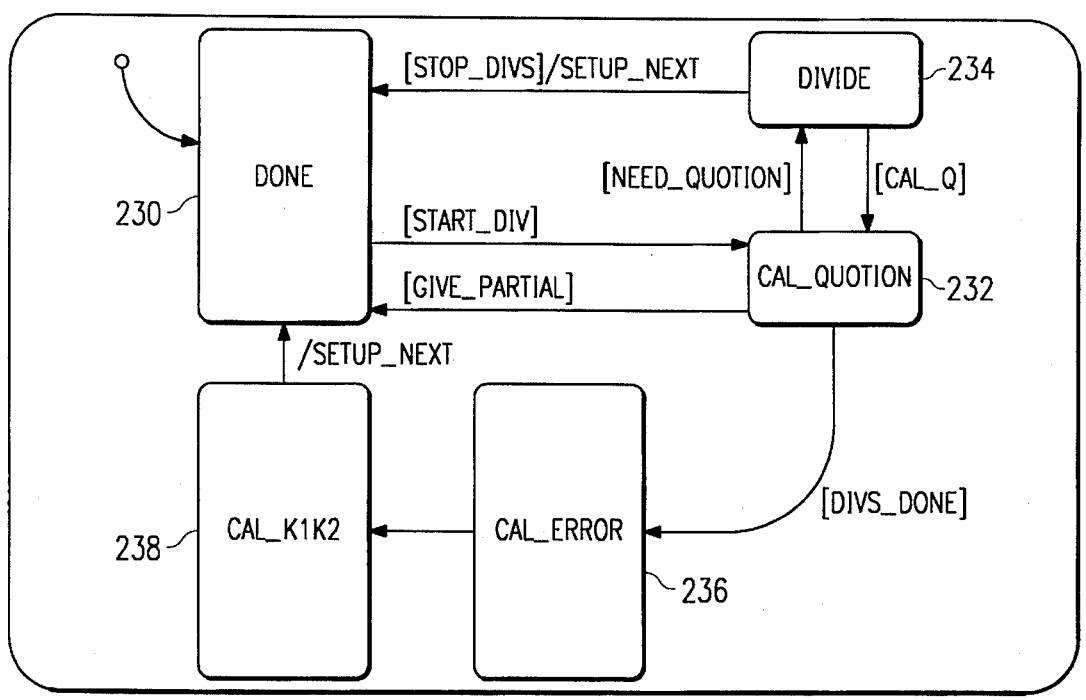

As shown in FIG. 16, initially DIVS 200 is in the Done state 230. Upon receiving the START_DIV signal, the CAL_QUOTION state 232 is entered. CAL_QUOTION calculates the next bit in the quotient by comparing the bit position of the most significant bit of the numerator and the bit position of the most significant bit of the denominator. Divide state 234 generates the partial quotient (partial slice length) and updates the numerator (by subtracting the denominator multiplied times the partial quotient). If a partial quotient is requested, the flow returns to the done state 230, unless the next quotient bit is bit "0", in which case the flow returns to the CAL_QUOTION state to get the last bit of the quotient. This feature aids in the implementation of the line draw engine, because the dicer 122 can be set to always draw the first pixel of the first slice and, therefore, the length of the first slice of a line should be one less than the actual length of the first line. Returning to CAL_QUOTION when bit "0" of the result is the next bit prevents the generation of a negative partial slice length. If a full quotient is requested or if the division is finished, the error term may be calculated in state 236 and the K1 and K2 terms can be calculated in the CAL_K1K2 state 238. While the above has been described in terms of calculating Q=DX/DY, the general flow described above can be used to calculate the repeat count (E/K1 or E/K2) as well. In addition to the serial divider, slicer 120 contains an arithmatic logic unit (ALU) to perform calculations on E, K1 and K2, since these calculations can be made using shifts and adds.

The value of E is dependent upon the type of line being generated. If the line is a Full First line, then initial error term $E_0$ is set to "0" if R=0 or to 4R–2DY if R<>0. By adjusting the initial error term in this fashion, the pixels forming the Bresenham line will all fall on the ideal line between the two endpoints or to the right of the ideal line (for a line in the first half-octant) as shown in FIG. 5b. The slicer forces the length of the last slice of a Full First line to "1". Similarly, for a Points First line, the slicer sets the initial error term $E_0$ to 2R–2DY and forces the length of the first slice to "1" and the length of the last slice to Q. This adjustment in the initial error term will result in all pixels falling on or to the left of the ideal line.

Dicer

The dicer 122 receives slice information from the slicer 120 and outputs either (1) slice information to the scanner 114 for writing to the frame buffer or (2) point information to the points controller 110 for use in generating other lines. In order to perform its functions, the dicer includes memory and an ALU for performing adds and shirts. For each slice output from the slicer 120, the dicer receives information on the length of the slice and the octant of the line for which the slice was generated. For the first slice of a line, the dicer 122 also receives the starting point of the slice (i.e., $X_0$, $Y_0$). After the initial slice, the dicer 122 tracks the location of the slices internally.

When outputting slice information to the scanner 114, the dicer 122 provides the starting point of the slice, the length and the octant code. The dicer also indicates whether the slice is the first or last slice of the line.

When generating points or slices, the output of the dicer is dependent upon a variety of options set for the line. As described above, a line can have a plurality of options set, such as SKIPFIRST and SKIPLAST. When the SKIPFIRST option is set, for example, if generating points, the first point of the first slice of a line would not be output or, if generating slices, the starting point and length of the first slice of a line would be modified such that the first point of the slice was not written to the frame buffer. Similarly, setting SIDE to "01" (pick left) or SIDE to "10" (pick right) will result in the dicer outputting only the rightmost or leftmost point of each slice of a line.

The dicer is also used in stretching, shrinking and shading. This aspect of the dicer 122 is described herein below.

SCANNER

The main purpose of the scanner 114 is to save slice information from the dicer 122 and save the information to the frame buffer 104. The scanner 114 generates address and color data to be written to the frame buffer 104.

In the preferred embodiment, the scanner 114 supports the 4-operand (source, pattern, mask and previous destination) logical operands specified by WINDOWS NT (sold by Microsoft Corp. or Redmond, Wash.). The scanner is also used in stretching, shrinking and shading as described below.

CLIPPED LINES

Figure 17:
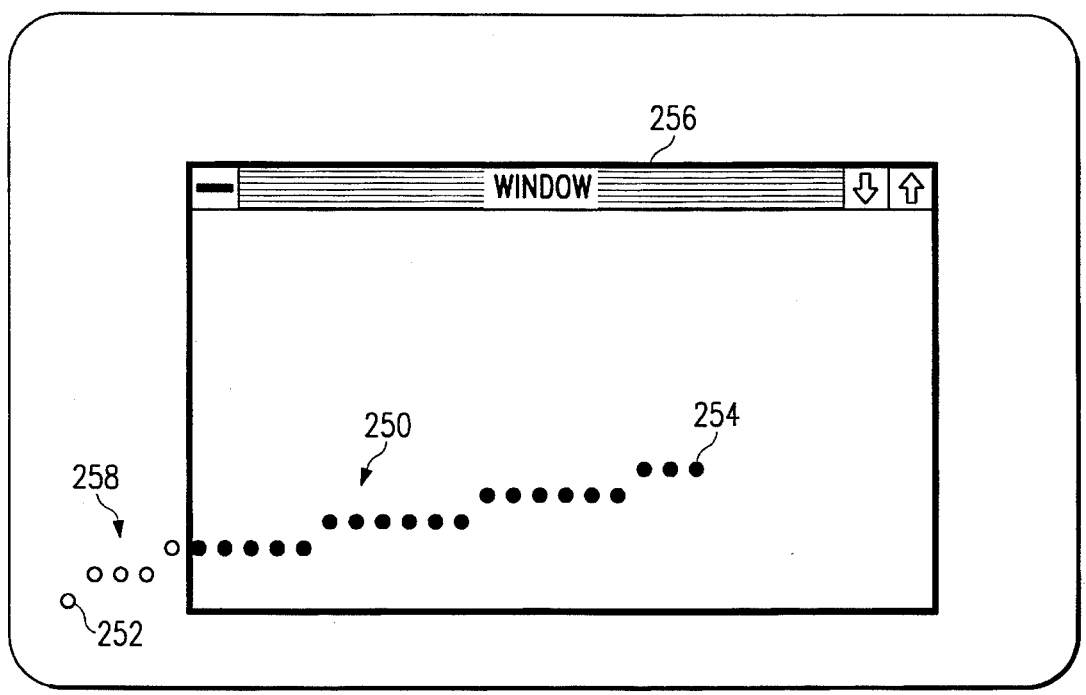
FIG. 17 illustrates a line clipped by a window.

In a windowed environment, such as MICROSOFT WINDOWS (sold by Microsoft Corp. or Redmond, Wash.), a line may be partially clipped by the window for which it is intended. FIG. 17 shows a diagram of a clipped line 250 having endpoints 252 and 254, where endpoint 252 is outside of the boundaries of the window 256 in which the line is to be displayed. Pixels 258 are outside the window and, therefore, not drawn.

FIG. 18 illustrates a method used in the preferred embodiment to draw clipped lines. In decision block 260, the command controller determines that a clipped line is to be drawn. In block 262, if the line is not clipped, the run-slice procedure described herein is used to draw the line. If the line is clipped, then the point (or points) of intersection are determined in block 264.

In block 266, assuming that the starting endpoint is outside of the window 256, the line is drawn from the point of intersection (i.e, the first pixel inside window 256) using the normal Bresenham technique described herein. Since the normal Bresenham technique uses only additions and subtractions, the points can be calculated in accordance with the pseudo-code set forth above using the hardware of the slicer 120 described herein. Until a diagonal step (note that the line is still translated to the first half octant and a diagonal step indicates the end of the slice) is taken in decision block 268 (i.e., until the end of the first slice within the window 256), the line is drawn using the normal Bresenham technique in block 270. Once a diagonal step is taken in block 268, K1 and K2 are recalculated as described above (K1=2*R and K2=2*R−2*DY) and the error term E is updated to the run slice error term by adding 2*R to the normal Bresenham error term (block 272). At this point, the run slice technique described herein is used to draw the rest of the line in block 274.

If the line exits the clipped window (i.e., $X_1$, $Y_1$ is outside of the window), the line draw engine does not need to switch back to normal Bresenham mode. In this case, the slice length of the last slice is shortened to the distance from the starting point of the slice to the window edge.

PARTIAL SLICES

As described above, the line draw engine 100 produces information on partial slices as the serial divider outputs quotient bits. In a simple case, this information can be used to start drawing a line while the divider is finishing the calculation. Thus, the dicer and scanner can be operating even though the total length of the first slice has not been completed, because the partial quotient will provide information which can be used to determine a minimum length. For example, if Q=001010100, the most significant "1" will indicate that Q≧64 and, therefore, that the first slice is at least 32 bits in length. The next "1" indicates that Q>64+16, and therefore, a partial slice of eight pixels can be added to the previous partial slice.

Even greater speed increase can be accomplished when the partial slice information is used to generate points for other lines, since generation of these lines can begin during the calculation of Q.

In FIG. 19, a flow chart shows the steps for generating partial slices. In block 282, the serial divider is calculating a next partial quotient N, where N is the bit position of a "1" in the quotient. For example, where DX=0101000 and DY=0110, Q=DX/DY=1101. Hence, the serial divider would serially output values indicating bit positions in the quotient set to "1", i.e., bit positions 3, 2 and 0. When the partial quotient information is generated by the serial divider, a slice length is generated and made available to the dicer 122. The length of the partial slice can be generated as being $2^{N-1}$, since the length of the first slice is int(Q/2), except for Point First lines where the length of the first slice is forced to "1" or Full First lines where the length of the slice is Q (see Tables III and IV). As the partial slice length information is output from the serial divider, it is made available to the dicer 122, including the starting point (for the first partial slice) and the length (block 284). As the dicer 122 operates on the partial slice information from the slicer 120, the serial divider continues the dividing process. Meanwhile, if the line is configured to generate slices for the scanner 114, the dicer 122 will send the partial slice to the scanner 114. The dicer 122 maintains the ending point of the partial slice so that it will start the next partial slice at the proper location. If the dicer 122 is generating points, then the points are output to the points controller in block 296. These points may be used to generate additional lines, as described herein. The process is repeated until the division is complete in decision block 286.

Similarly, a partial repeat count can also be generated to speed drawing of the slices. The flow chart of FIG. 20 illustrates this technique. In block 300, the serial divider is calculating a next partial quotient N, where N is the bit position of a "1" in the quotient. In block 302, the slicer uses the partial quotient information to derive a partial repeat count. The partial repeat count can be generated as $2^N$, since the repeat count equals E/K, where K equals K1 or K2 depending upon the sign of E, as described above. The partial repeat count is used to send that number of slices to the dicer 122 in block 304, while the dividing process continues. The slicer continues to send out slices with each partial quotient from the serial divider until the division is finished in decision block 306.

FIG. 21 illustrates a chart showing operation of the serial divider to calculate partial repeat counts. In this example, E=−80, K1=6 and K2=−20. In the first divide cycle, the numerator equals abs(E)=80, the denominator equals abs(K1)=6 and the division 80/6 yields a partial quotient of 8. Since E<0, the slice length is Q. From this partial quotient, it can be determined that the repeat count is at least eight, therefore, the slicer 120 may begin sending eight slices to the dicer 122. After subtracting 48 (8*6) from the numerator (80), the new error, E, can be calculated as −32 (−80+48) and the new numerator equals abs(E).

In the second division cycle, a partial quotient of 4 results from the calculation of 32/6. Hence, the slicer 120 can send an additional 4 slices of length Q to the dicer 122. In the next division cycle, a partial quotient of 1 results from the division 8/6. Consequently, an additional slice of length Q can be sent from the slicer 120 to the dicer 122.

At this point, E=−2 and the division 2/6 would render a result of zero. As described above, the calculation of the repeat count continues until the addition of K1 causes the error, E, to change signs. Consequently, the result of a partial quotient of zero, along with a non-zero remainder, causes an additional slice to be sent to the slicer 120 to the dicer 122 (and hence the characterization of the repeat count equaling abs(int(E/K))+1 as set forth above). For an explanation of situations where a zero remainder results after calculation of a partial quotient, see the discussion of the calculation of repeat counts hereinabove.

In the fifth division cycle of FIG. 21, E=4; consequently the new slice length is Q+1 (see Table II) and K=K2. The calculation of E/(abs(K2)) results in a quotient of zero; consequently, one slice of Q+1 is sent from the slicer 120 to the dicer 122. The error is updated to E=4−20=−16; consequently, the slicers revert to lengths of Q and K=K1.

As can be seen, the use of partial quotients in the calculation of repeat counts can greatly increase the efficiency of the line draw engine, since the drawing of lines can be accomplished during calculations.

Serial dividers are well-known in the art and, therefore, will not be discussed in great detail herein. In one embodiment of a serial divider, the most significant bit position of the numerator is compared to the most significant bit position of the denominator. The denominator is shifted by the difference (D) in the most significant bit positions and compared to the numerator. If the denominator is less than or equal to the numerator, partial quotient is equal to $2^D$; otherwise the partial quotient is equal to $2^{D-1}$. Thus in the example of E/K1=80/6=01010000/0110, D=6−2=4. Since 0101000<01100000, the first partial quotient equals $2^{4-1}=8$.

It should be noted that the capability to use partial slices or partial repeat counts can be selectively enabled or disabled using a configuration bit.

LINEAR SCALING AND SHADING

General

The line draw capabilities described above are used in the preferred embodiment of the present invention to perform line stretches and shrinks. In a stretch or a shrink operation, colors from a source line are used to define the colors in a destination line. In a stretch operation, the destination line has more pixels than the source line. Hence, the stretching operation places color information from the source line, typically as evenly as possible, and the remaining pixels of the destination line (the "in between" or "intermediate" pixels) can be either set to intermediate color values (shading) or may repeat the color values of the source pixels (replication). In a shrinking operation, the destination line has fewer pixels than the source line; hence, the shrink operation determines which of the colors from the source line will be skipped.

Figure 22A:
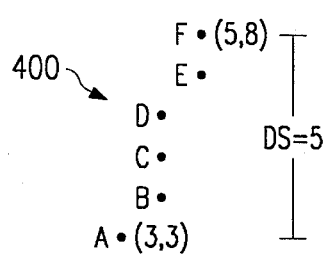
FIG. 22a illustrates an exemplary source line.
Figure 22B:
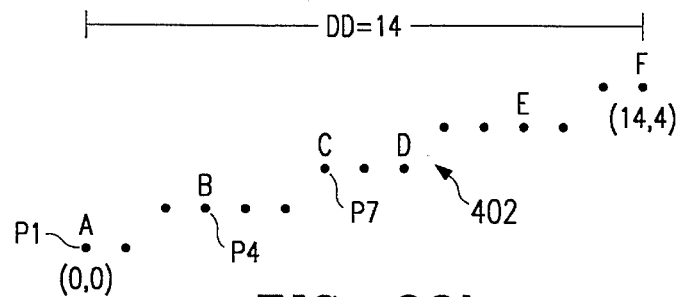

An example of a shaded stretch is shown in connection with FIGS. 22a and 22b. FIG. 22a shows a source line whose colors are used to define the colors in a destination line. Source line 400 has six pixels, each labeled with a respective color A–F. It is assumed herein that a RGB (Red-Green-Blue) color space is used to define the colors for each pixel. With an RGB colorspace, the color for each pixel has a value corresponding to its red, green and blue color components. In a 24-bit colorspace, each component color has a value between 0 and 255.

Destination line 402, shown in FIG. 22b, has fifteen pixels. The six colors corresponding to the pixels of the source line 402 are spread across destination line. Using shading, the intermediate pixels, are set to values to form a blend of colors between the colors from the source line (A–F). Hence in the illustrated example of FIG. 22b, the second and third pixels of the destination line would be set to values between colors A and B. The method of performing the shading is set forth in greater detail in connection with FIGS. 29–33.

Figure 22C:
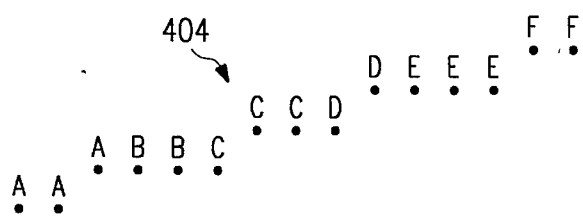

A replicated stretch operation is shown in conjunction with FIGS. 22a and 22c. The coordinates of the destination line in this example are the same as in the destination line of FIG. 22b; however, each color of the source line 400 is replicated in the destination line 402 until the color changes to the next color from the source line 400.

Figure 22D:

A shrink operation is described in connection with FIGS. 22a and 22d. In this example, the destination line has only four pixels. Hence, four of the pixels of the source line are chosen for the destination line and two pixels are skipped.

In the preferred embodiment, stretching and shrinking are performed using the line draw engine to calculate the positions of the colors from the source line on the destination line. Further, the intermediate colors for a shaded stretch are defined using the line draw engine. This capability has been found to greatly reduce the time need to generate lines using stretching and shrinking operations.

Shaded Stretch

Figure 23:
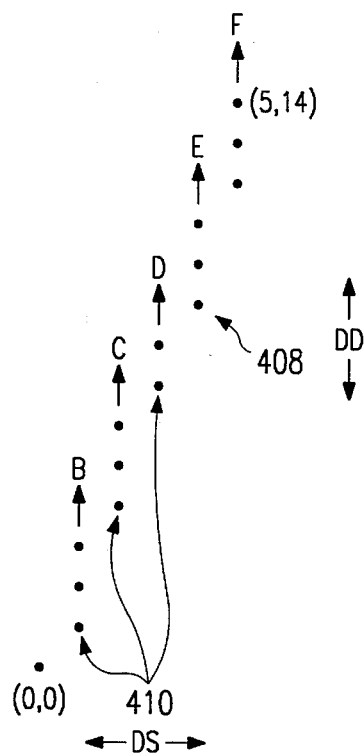
FIG. 23 illustrates an exemplary stretch line used in the stretching of the source line of FIG. 22a to the destination line of FIG. 22b.

As shown in FIG. 23, a stretch line 408 is drawn to perform the stretch or shrink operation. In the preferred embodiment, the first endpoint of the stretch line 408 is set to (0,0) and the second endpoint is determined responsive to the distance between the first and last pixel ("pixel length") on the major axes of the source and destination lines. In FIG. 22a, for example, the major axis of the source line has a pixel length of five and the minor axis has a pixel length of two. Hence, DS (pixel length of the major axis of the source line) would be set to five. The destination line 402 of FIG. 22b has a major axis pixel length of fourteen and a minor axis pixel length of three. Hence, DD (pixel length of the major axis of the destination line) would be set to fourteen. FIG. 23 shows a stretch line having coordinates (0,0) and (5, 14). As described below, depending upon the stretch/shrink operation being performed, the coordinates of the second endpoint may vary from (DS, DD).

From the foregoing, it can be seen that the orientation of the stretch line is dependent upon the relative pixel lengths of the source and destination lines. If the lines have the same number of pixels, DD will equal DS and, thus, the stretch line will be diagonal. In this case, there is a one-to-one correspondence between the source and destination lines, and colors from the source line can be copied to the destination line in order. If DD≧2*DS, then the stretch line will have vertical slices and diagonal corrections between slices. If DD<2*DS, the stretch line will have diagonal slices with vertical corrections. As will be discussed hereinbelow, the way in which information from the slices is used will vary depending upon the orientation of the slices of the stretch line.

FIG. 23 shows an exemplary stretch line 408 for the source and destination lines of FIGS. 22a and 22b, respectively. As shown in FIG. 23, and in the preferred embodiment, the stretch line will be either Points First or Full First in order to obtain the most even distribution of pixels among the slices of the stretch line. If a Points First line is used, the first point will be ignored for stretch lines with vertical slices.

The first pixel of the destination line is given the color of the first pixel of the source line (color A). For stretch lines with vertical slices, such as stretch line 408, the numbers of pixels in the slices define the locations on the destination line where colors from the source line are to be placed. For example, the first full slice of stretch line 408 has a length of three pixels; hence, color B is placed three pixels away from the first pixel (color A). The second full slice of stretch line 408 also has a length of three and, hence, color C is placed three pixels from the pixel with color B. The third slice of stretch line 408 has a length of two. Thus, color D is placed two pixels away from color C.

Figure 24A:
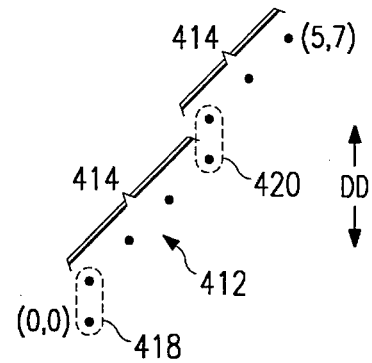
Figure 24B:
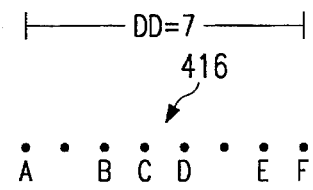

FIG. 24a shows an example of a stretch line between source line 400 and a destination line 416 (FIG. 24b) having eight pixels (and, thus, a major axis pixel length of seven). The stretch line 412 is a formed between (0,0) and (5,7). As shown in FIG. 23b, the stretch line 412 has an initial pixel followed by two diagonal slices 414 having lengths of four and three. With a stretch line with diagonal slices, corrections between slices indicate that a pixel is skipped in the destination. Also, in the preferred embodiment, for stretch lines with diagonal slices, the initial point in the Points First line is not ignored. Consequently, after the first pixel is set to color A, the first correction 418 indicates that a pixel is skipped in the destination line 416 before color B is applied to the third pixel. Color C is applied to the fourth pixel and color D is applied to the fifth pixel. Correction 420 indicates that the sixth pixel in destination line 416 is skipped and color E is applied to the seventh pixel. Color F is applied to the eighth pixel. The last pixel of the stretch line is ignored in this case.

The intermediate pixels in destination line 416 can be shaded as described below. It should also be noted that for stretch operations using stretch lines with diagonal slices, intermediate pixels are always disposed between two colored pixels, and hence an averaging of the color data for each color component can be performed using an add and a shift operation.

Replicated Stretch

Figure 25:
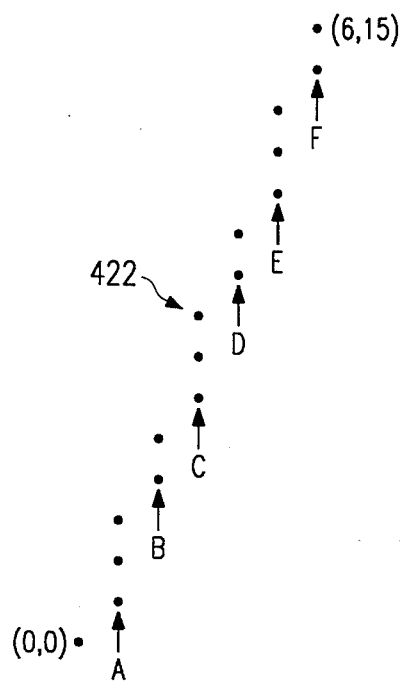
FIG. 25 illustrates a stretch line used in a replicated stretch operation from the source line of FIG. 22a to the destination line of FIG. 22c.

FIG. 25 illustrates a stretch line 422 for a replicated stretch, using the source line 400 of FIG. 22a and the destination line 404 of FIG. 22c. For a replicated stretch, in the preferred embodiment, a Point First or a Full First line is defined between (0,0) and (DS+1, DD+1). Using a Point First line 422, as shown in FIG. 25, the first pixel of the stretch line is ignored and the number of pixels of the remaining full slices are used to determine how many times each color from the source line is repeated in the destination line. Thus, as shown in FIG. 25, color A is repeated for the first three pixels of the destination line 404, color B is repeated twice (for the fourth and fifth pixels) in the destination line and so on.

Figure 26A:
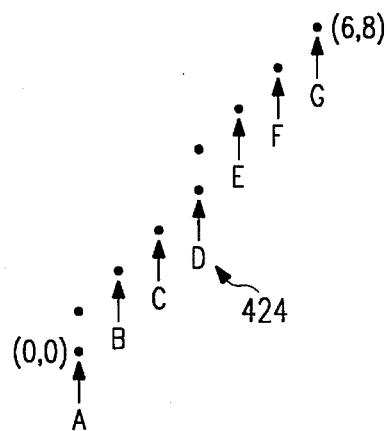
Figure 26B:
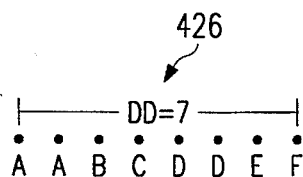

FIGS. 26a and 26b illustrate a replicated stretch using a stretch line 424 with diagonal slices. As with FIGS. 24a and 25b, the source line 400 of FIG. 22a is stretched to an eight pixel destination line 426. With the replicated stretch, the stretch line 424 is defined between coordinates (0,0) and (DS+1, DD+1), i.e., (6,8). For a stretch line with diagonal slices, the first point is not ignored. Similar to the example of FIGS. 24a and 24b, correction in the stretch line 424 indicate the colors in the source line which are repeated twice in the destination line. Thus, as shown in FIGS. 26a and 26b, color A is repeated twice because of correction 428, colors B and C are used once, color D is repeated twice and colors E and F are used once.

Shrink

Figure 27A:
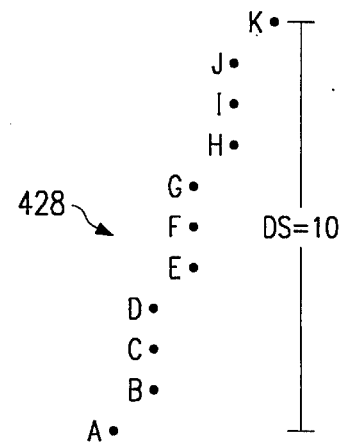
FIG. 27a–27c illustrate exemplary source, destination and stretch lines used in a shrink operation.
Figure 27B:
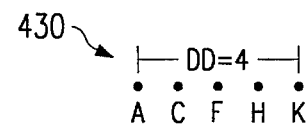
Figure 27C:
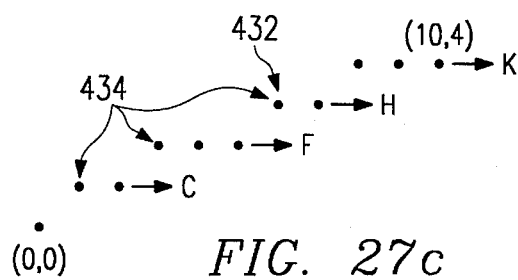

FIGS. 27a–27e illustrate use of a stretch line 432 to perform a shrink between the source line 428 of FIG. 27a and the destination line 430 of FIG. 27b. If DD≦DS/2, the slices of the stretch line are horizontal. If DD>DS/2, the slices of the stretch line are diagonal. In FIGS. 27a and 27b, DS=10 and DD=4 and, hence, the stretch line 432 has horizontal slices 434.

Since the stretch line 432 has horizontal slices 434, the initial point is ignored. Each full slice of the stretch line 432 indicates the number of pixels to skip in the source line 428 to find the next color to apply to the destination line 430. The first pixel of the destination line 430 is set to the color of the first pixel of the source line 428. The first full slice has a length of two, and hence, the next color to apply to second pixel of the destination line 430 is color C. The second full slice of the stretch line 432 has a length of three. Thus, the third color to apply to the destination line is color F, which is three pixels removed from color C. The third slice has a length of two; therefore color H is applied to the fourth pixel of the destination line. The fourth slice has a length of three, thus color K is applied to the last pixel of destination line 430.

Figure 27D:
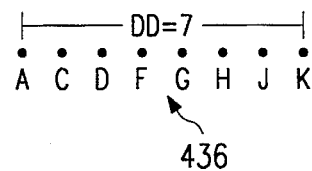
FIGS. 27d–27e illustrate exemplary destination and stretch lines used in a second shrink operation.
Figure 27E:
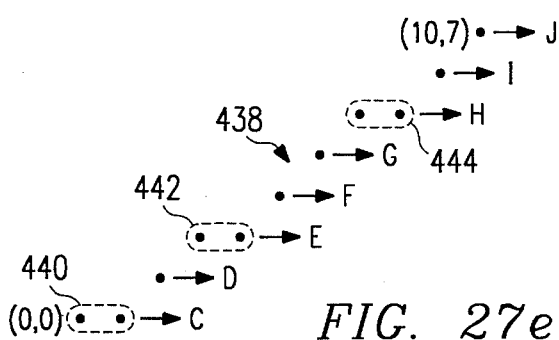

FIGS. 27a, 27d and 27e show source line 428, destination line 436 and stretch line 438 in a case where the destination line is eight pixels long. Accordingly, stretch line 438 has diagonal slices. When a stretch line with diagonal slices is used, the first point is not ignored. Each correction in a stretch line with diagonal slices indicates a pixel in the source line which is skipped in determining colors for the destination line. Thus, in the example of stretch line 438, correction 440 indicates that color B is skipped, correction 442 indicates that color E is skipped and correction 44 indicates that color I is skipped. The last pixel in the stretch line 438 is ignored.

As described above, colors for a destination line may be defined by reference to a source line and generated using a stretch line. Because the line draw engine calculates lines at high speed using run-slice techniques, the stretch line may be calculated quickly, with relatively few operations. The information from the stretch can then be used to map the colors from the source to the destination without additional complex arithmetic. Consequently, stretching and shrinking operations may be performed at high speed, without additional computation resources.

FIG. 28 illustrates a flow chart describing the steps used in performing stretch/shrink operations. In block 450, line data (e.g., two endpoints or one endpoint and axis lengths for each line) is provided for the source and destination lines. If the operation is a shaded stretch, the stretch line is calculated as a line between endpoints (0,0) and (DS, DD) in block 464. The stretch line information is used to calculated segments for the destination line which terminate on colors derived from the source line in block 466. In block 468 shading is applied. The step of shading may be commenced as soon as the first segment is defined; thus k may be performed concurrently with the calculation of subsequent segments.

If the operation is a replicated stretch, the stretch line is calculated as a line between endpoints (0,0) and (DS+1, DD+1) in block 470. In block 472, the stretch line information is used to repeat colors from the source line to the destination line in block 472.

If the operation is a shrink, the stretch line is calculated in block 474 as a line between (0,0) and (DS,DD). In block 476, the stretch line information is used to determine which colors from the source line are applied to the destination line in block 476.

It should be noted that while the stretch lines shown above in the preferred embodiment have been calculated as Points First to take advantage of resources in the line draw engine, other methods of calculating the stretch lines could also be used which may vary the particular coordinates used in generating the stretch lines.

Shading

The shading process is used when stretching a line or for drawing an original line with a continuum of colors between endpoints. When using shading in conjunction with stretching, segments (also referred to as "Y lines" in this section) of the destination line are defined, as described above with reference to the Bresenham equations, between pixels on the destination line which have color information as determined by the stretching process described above. For example, in FIG. 22b, segments would be defined between points P1 (color A) and P4 (color B), between P4 (color B) and P7

(color C) and so on. Each segment is configured into three lines which indicate the destination line's R, G and B color values as a function of the segments major direction (shown in the examples herein as the X coordinate direction) according to the present embodiment. The intermediate values determined by the R, G and B lines are then used to determine the color values for the intermediate points of the segment.

A simple example of three R, G, and B lines that are used to configure the segment between color value A (with RGB color components $R_1$, $G_1$ and $B_1$) at point P1 and color value B (with RGB color components $R_4$, $G_4$ and $B_4$) at point P4 (hereinafter Segment AB) of destination line 402 is depicted with reference to FIGS. 29a–29c. In the illustrated example shown in FIGS. 29a through 29c, the red component 482 of the destination line does not vary from P1 to P4 (i.e., the red component, $R_1$, of color value A equals the red component, $R_4$, of color value B) while the G component 480 and B component 484 increase from color value A to color value B. In this example the R, G and B lines are in the first octant before transformation, although the lines can lie in any octant. A different, more complex shading example in which the R, G and B lines are not all in the first octant is illustrated with respect to FIG. 31.

The process for shading a stretched line is now explained in more detail with reference to FIG. 30. The R, G and B lines for a segment are generated between each of the pixels with color information, generated in the stretching process, on the destination line. Since DS is the number of pixels with color information on the destination line, DS-1 segments (each containing an R, G and B line) can be defined between the pixels with color information. Accordingly, the variable count, as depicted in block 486, is set to DS-1, and this number of segments are generated by the process shown in blocks 488 through 492.

Figure 31:
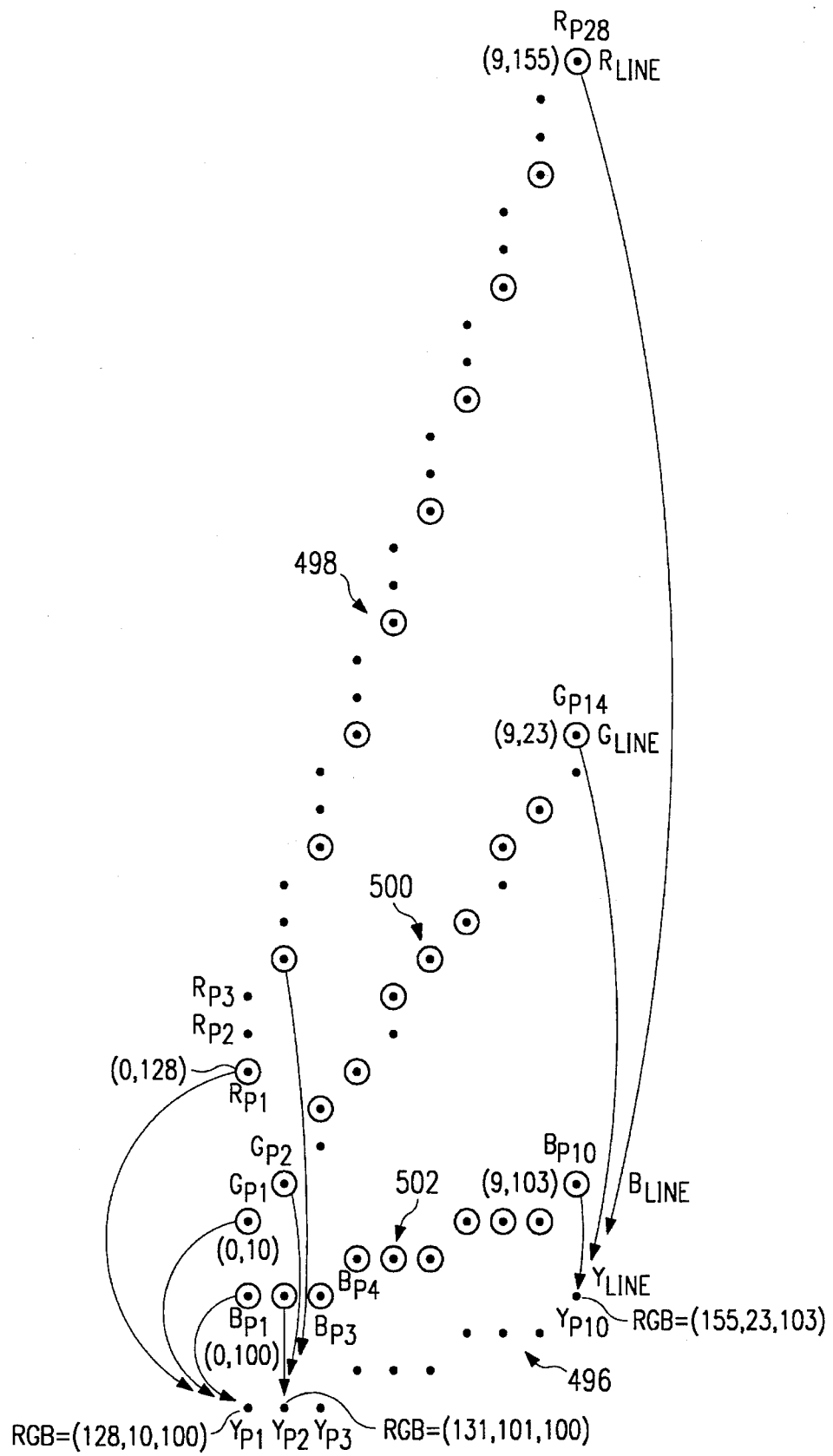
FIG. 31 illustrates exemplary R, G, B, and Y lines used in a shade operation.

To generate a segment, each of the R, G and B lines for the segment are assigned endpoints in block 488. The X coordinate for each endpoint of an R, G or B line is equal to the X coordinate of the corresponding segment. The Y coordinate for each endpoint of an R, G or B line is the value of the respective color component at the corresponding endpoint of the segment. Referring to FIG. 31, which illustrates a separate, more complex example from that shown above with respect to FIGS. 29a–c, three R, G, and B lines are defined corresponding to a segment with a first endpoint $Y_{P1}$ with an XY coordinate equal to (0,0), and a second endpoint, $Y_{P10}$, with an XY coordinate equal to (9,2). The first endpoint $Y_{P1}$ has RGB color values of (128, 10, 100) while the second endpoint $Y_{P10}$ has RGB color values of (155, 23, 103). The R line 498 is thus defined by endpoints (0, 128) and (9, 155); the G line 500 is defined by the endpoints (0, 10) and (9, 23); and the B 502 line is defined by the endpoints (0, 100) and (9, 103).

Next, as depicted in block 490 of FIG. 25, points for the R, G and B lines are generated by the slicer 120 and the dicer 122, as described above, including transformation of the RGB lines to the first half-octant for processing. In the preferred embodiment, the R, G and B lines are generated as Full First lines, which forces the last slice to consist of a single point. Configuring the lines as Full First lines aids in applying the color data from the last pixel of each of the R, G and B lines to the last pixel of the Y line, as will be evident from the description set forth below. Scanner 114 receives the slice data from dicer 122 for each line and assembles the data to draw the shaded segment to the frame buffer in block 492. In the preferred embodiment, scanner 114 stores one slice from each or the four lines (Y, R, G and B), along with configuration data, in a buffer memory referred to herein as an MBUF. The slicer 120 assembles data from the lines until data from the shortest slice is exhausted; at that time, a new slice is brought in for the exhausted line (or lines). Consequently, in the preferred embodiment, point generation (block 490) and assembly (block 492) are being performed concurrently, even though shown in separate blocks.

Figure 32:
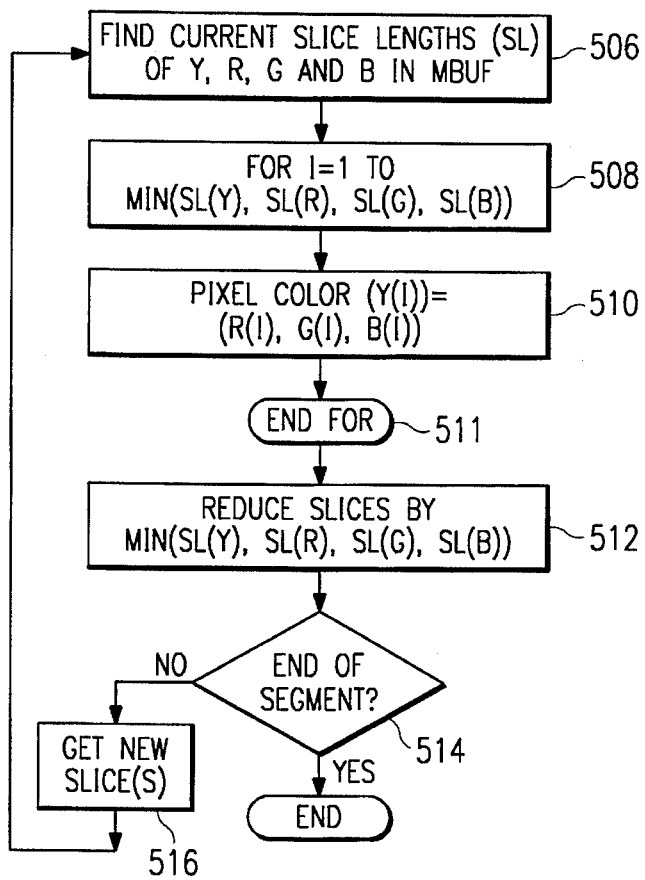
FIG. 32 is a flow chart describing a shade operation.

The process of assembling by scanner 114 is now explained with more detail with reference to FIG. 32. The MBUF stores data for one slice of each of the Y, R, G and B lines. In block 506, the slicer determines the length of each slice currently in the MBUF. For the Y line, and for any of the R, G, B lines which lie in the half-octants labeled in FIG. 4 as "0000", "1000", "1001", "0001", "0011", "1011", "1010", or "0010", the slice length is equal to the number of pixels in the slice. For R, G, or B lines lying in the half-octants labeled "1100", "1101", "1111" or "1110", the slice length is equal to one less than the number of pixels in the slice, since, as can be seen in the G line of FIG. 31, a line in one of these half-octants will have two color values corresponding to an X value of the destination line at correction locations in the color line (e.g., either $G_{P3}$ or $G_{P4}$ could be selected as the green component for the segment at $Y_{P3}$ and either $G_{P6}$ or $G_{P7}$ could be chosen as the green component for the destination line at $Y_{P5}$). For purposes of illustration, it is assumed that when an R, G, or B line is in one of the aforementioned half-octants, the last pixel of each slice will not be used for color information, although the first pixel of each slice (after the first slice) could be unused for color information as well. For R, G and B lines lying in octants "0100", "0101", "0111" and "0110" the slice length is set to one, since these lines have a correspondence of one slice per pixel in the Y line. As shown in FIG. 31, the first pixel in each slice of a line in one of these octants is used for color information; in practice, any pixel in the slice could be used, such as the middle or last pixel.

Referring again to FIG. 32, in block 508, the scanner determines the minimum, effective slice length of the Y, R, G and B lines because the scanner 114 assembles the Y, R, G and B slices until the end of the shortest slice, since it holds the information for only one slice per line. Next, in block 510, the pixel color values R, G, and B are determined for each point (X,Y) on the destination line. This determination is made for each pixel on the Y line by taking the R, G, or B color values from the corresponding pixels of the R, G, and B lines, respectively. This selection and assembling in block 510 is repeated until the end of the Y, R, G or B slice with the minimum length at which time the slices are reduced in length by the number of pixels assembled, i.e., by the value min(SL(Y), SL(R), SL(G), SL(B)). In block 516 the next slice is retrieved for the slices whose lengths have been reduced to zero. This process continues until the end of the segment, as shown in block 514.

An example of the above process is illustrated with reference to FIGS. 31, 33a and 33b. As described above, line 496 is a segment (Y line) composed of pixels $Y_{P1}$, $Y_{P2}$, $Y_{P3}$ ... $Y_{P10}$. Line 498 is the R line with pixels $R_{P1}$, $R_{P2}$, $R_{P3}$. .. $R_{P28}$, with slices in the vertical direction and corrections in the diagonal direction. Line 500 is the G line with pixels $G_{P1}$, $G_{P2}$, $G_{P3}$, .. $G_{P14}$, with diagonal slices and horizontal corrections. Line 502 is the B line with pixels $B_{P1}$, $B_{P2}$, $B_{P3}$ ... $B_{P10}$, with horizontal slices and diagonal corrections.

As described in block 506 of FIG. 32, the slice lengths, SL, of the Y, R, G and B lines are as follows. The slice length, SL, of R line 498, as a "0100" line, is one, the slice length, SL, of G line 500, as a "1100" line, is two (the actual slice length, three, minus one) and the slice length, SL, of B line 502, as a "0000" line, is two, the actual slice length. Then as described in block 508, the minimum slice length is determined. In this example of FIG. 31, the minimum slice length is one, the slice length of R line 498.

Figure 33A:
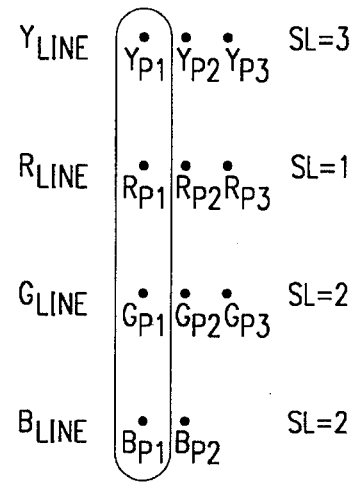
FIGS. 33a–33c illustrate the processing YRGB lines for shading.
Figure 33B:
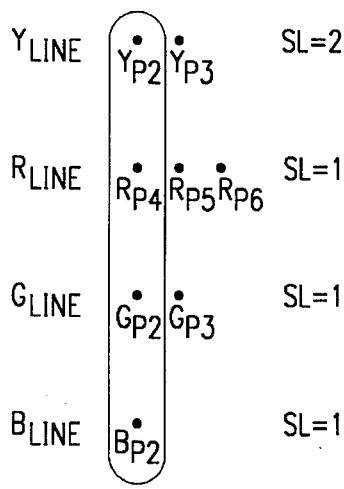

In the first pass, as depicted in block 508 of FIG. 32, the color values of $R_{P1}$, $G_{P1}$, $B_{P1}$ and $Y_{P1}$ (encircled in FIG. 31 and 33a and equal to (128, 10, 100)) are assembled and applied to the first point on the destination line, $Y_{P1}=(0,0)$. The R line 498 has three pixels, $R_{P1}$, $R_{P2}$, $R_{P3}$, corresponding to $Y_{P1}$. In the present embodiment, scanner 114 selects the R color value, 128, of the first pixel, $R_{P1}$, of the first slice. The process of block 510 is only performed once before control passes to decision block 514 because, as stated above, the minimum slice length is one, and the R line now requires a new slice. Since the end of the segment has not been reached, as depicted in block 514, R line 498 receives a second slice as shown in block 516 of FIG. 32. The remaining slices are reduced by one pixel as shown in FIG. 33b.

Figure 33C:
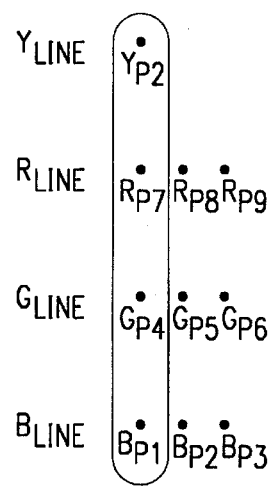

In the second pass, shown in FIG. 33c, the color values of $R_{P4}$ (the first pixel on the second slice), $G_{P2}$, $B_{P2}$ and $Y_{P2}$ are assembled and applied to the second point on the segment, $Y_{P2}=(1,0)$. The RGB color values for $Y_{P2}$ are (131, 11, 100). New slices are now required for the B line, because $B_{P2}$ is the last pixel on the first slice; the R line, because only the one pixel of each slice of a "0100" is assembled, and thus a new slice is needed after each pass; and the G line because as a "1100" line, $G_{P3}$ and $G_{P4}$ have the same X coordinate and, so the color value of $G_{P3}$ is ignored.

In the third pass, the color values $R_{P7}$ (the first pixel on the third slice), $G_{P4}$ (the first pixel on the second slice), $B_{P3}$ and $Y_{P3}$ are assembled and applied to the third point on the current segment, $Y_{P3}=(2,0)$. The RGB values of this point equals (134, 13, 101). The scanner selects $G_{P4}$ rather than $G_{P3}$ because, as stated above, in lines with diagonal slices when two pixels of adjacent slices correspond to the same X coordinate, the scanner selects the pixel with the higher color value, i.e. the first pixel on the second slice. New slices are required for the R line and the Y line.

The above process is continued until the end of the R, G, B and Y lines, i.e. when the XY coordinate of the segment equals (9,3).

NON-LINEAR SHADING AND STRETCHING

Non-Linear Scaling

The preceding section described a stretching function which is linear, i.e., the pixels of the source line are distributed as evenly as possible along the destination line. In some situations, however, it may be desirable to distribute the source pixels along the destination line according to a formula which is non-linear. Similarly, it may be desirable to shade in a manner in which the color transition between the endpoints of a line or line segment is non-linear.

Figure 34A:
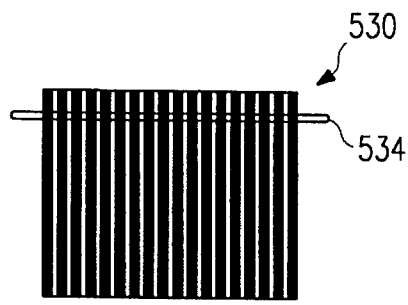
FIGS. 34a and 34b illustrate an example of non-linear scaling.
Figure 34B:
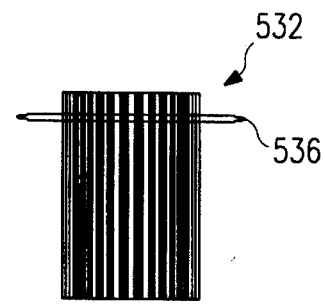

FIGS. 34a and 34b illustrate an application where non-linear stretching may be used to create a desired three dimensional effect. FIG. 34a illustrates a two dimensional image 530. Image 530 may be stored in a non-visable section of the frame buffer memory as a bit-mapped image. The desired three dimensional effect is to manipulate the data of source image 530 to generate a destination image 532 which has the appearance of the source image 530 being wrapped around the visible half of a cylinder. For purposes of illustration, the view shown in FIG. 34b is that of a viewer looking straight at the cylinder.

The effect of the image 530 being wrapped around a cylinder is provided by defining source lines in the source image 530 (for example, the line of pixels shown at 534 disposed horizontally across image 530) and scaling the source lines to fit the length of a corresponding destination line in the destination image 532 by shrinking or stretching. Unlike the linear scaling described in the preceding section, however, the degree of stretching and scaling during the translation of pixels from the source line to destination line may vary. In FIGS. 34a and 34b, for example, the shrinking of the source line 534 is greater at the edges of the corresponding destination line 536 and is lesser towards the middle of the destination line 536.

Figure 35A:
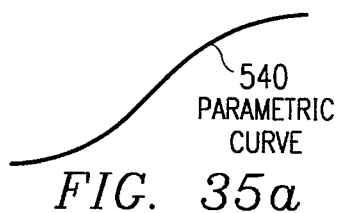
FIGS. 35a–35c illustrate polyline approximation of a parametric equation.

In general, an ideal translation function can be provided by a parametric curve, i.e., a curve which may be described by an equation of the form $y=a_n X^n + a_{n-1} X^{n-1} + \ldots + a_3 x^3 + a_2 x^2 + a_1 x + a_0$. An example of the type of parametric curve which might be used in the example of FIGS. 34a and 34b is shown as curve 540 in FIG. 35a. The slope of the curve indicates the degree of scaling. As described above in relation to linear scaling, a slope of forty five degrees in the stretch line indicates a one-to-one correspondence between the source and destination lines; as slopes increase above forty five degrees, the amount of stretching increases and as slopes decrease below forty five degrees, the amount of shrinking increases.

Figure 35B:
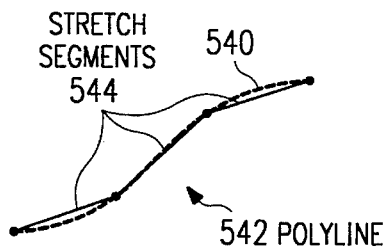
Figure 35C:
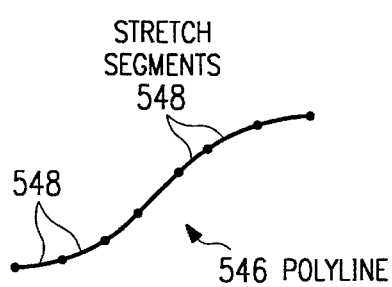

In the preferred embodiment of present invention, the non-linear stretch line is represented as a polyline. A polyline is composed of a series of straight line segments, where each endpoint of each interior line segment is shared with respective adjacent line segments. A polyline can be used to approximate the parametric curve, as shown in FIGS. 35b and 35c. Generally speaking, the accuracy with which the parametric curve is approximated increases with number of polylines used to perform the approximation. As shown in FIG. 35b, the curve 540 may be represented as a polyline 542 having three stretch segments 544. Each stretch segment is a run-slice line composed of one or more slices. In FIG. 35c, greater accuracy is achieved using a polyline 546 composed of seven stretch segments 548. At some point, however, the improvement in the visual effect from improved accuracy of the stretch line will not be discernable to the viewer.

Figure 36:
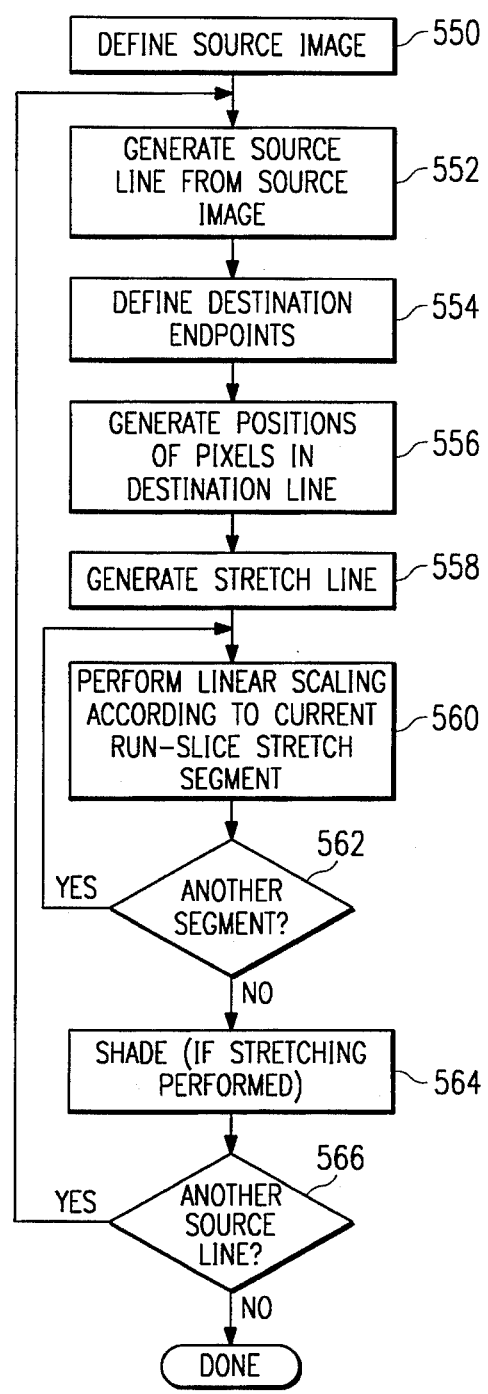
FIG. 36 is a flow chart of a method for non-linear scaling.

Once a polyline is defined for the stretch line, the stretch operation may be performed using the techniques described in connection with non-linear stretching. FIG. 36 is a flow chart describing the process of non-linear stretching. In block 550, the source image (e.g. image 530) is defined. Typically, this image is defined as a bit-mapped image. From the source image, a first source line is defined in block 552, by defining endpoints for the source line in relation to the source image, such that colors from the source image can be applied to the source line. While the source line is shown as a horizontal line in FIG. 34a, the source line may have any desired angle relative to the source image. Further, the source line may have endpoints which are either inside or outside the source image.

In block 554, the endpoints of the destination line are defined. The endpoints may be determined by the line draw engine 100 (e.g., by configuring the dicer 122 to generate endpoints for a polygon as described above in connection with FIGS. 10–13 ) or may be supplied by the host application. In block 556, the position of each pixel of the destination line is generated using the run-slice techniques defined above.

In the preferred embodiment, the stretch polyline may be defined either by (1) polyline data from the host application or (2) by parametric curve data from the host application, from which data the line draw engine 100 derives the polyline stretch line. If polyline data is supplied by the host application, the line draw engine 100 will generally receive a series of endpoints defining the stretch segments, from which the slicer 120 and dicer 122 can generate the slices corresponding to each stretch segment.

Figure 37A:
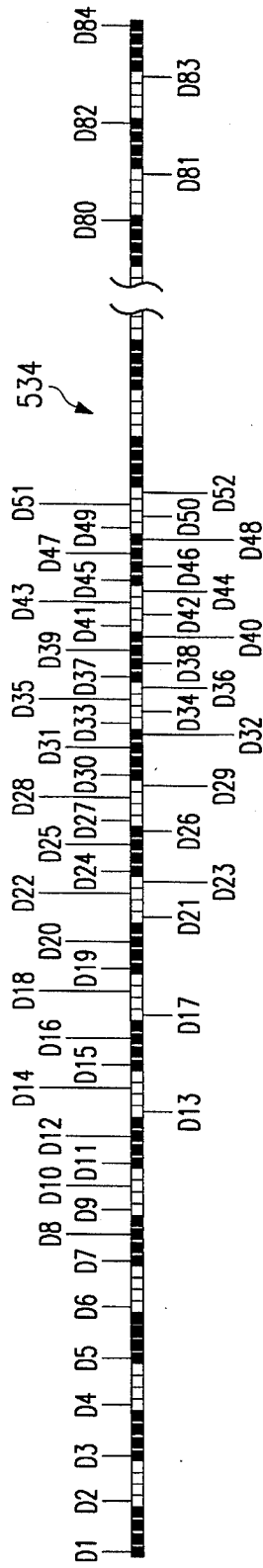
FIGS. 37a to 37c illustrate the non-linear scaling of one scan line of the examples of FIGS. 34a and 34b, respectively.
Figure 37B:
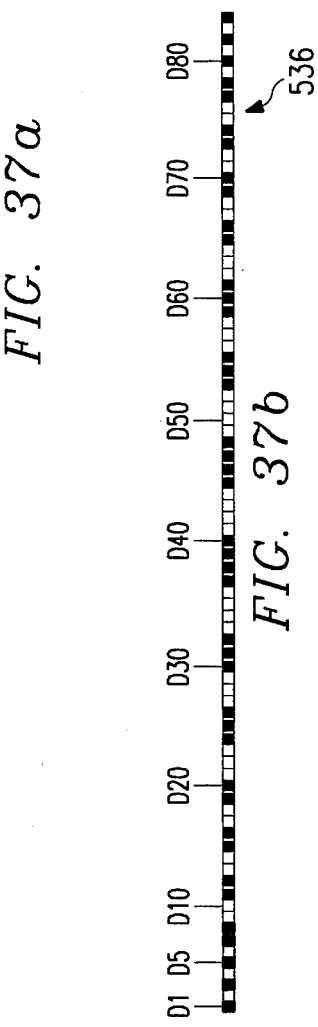
Figure 37C:
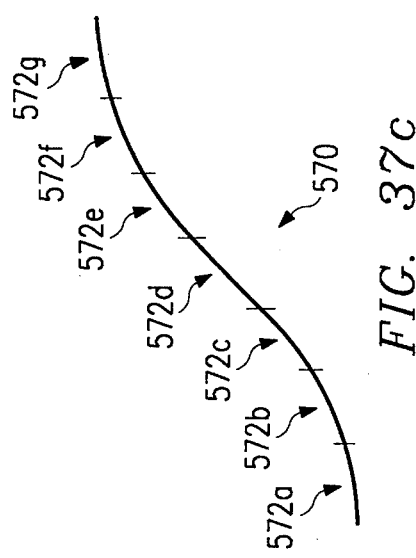

In block 558, a stretch line is generated by the line draw engine, either from polyline data or from parametric curve data. A non-linear stretch polyline will comprise two or more stretch segments, each segment comprised of one or more slices. FIGS. 37a–37c illustrate source line 534, destination line 536 and a stretch line 570 (not to scale, for illustration purposes), respectively, corresponding to the non-linear stretch illustrated in FIGS. 34a and 34b. Stretch line 570 has seven segments 572, labelled individually as stretch segments 572a–572g. After generating the slices for the first stretch segment 572a, the segments for the remaining stretch segments may be generated concurrently with the performance of step 560.

In block 560, linear scaling of the source line is performed using a current stretch segment. This scaling is performed as described in connection with FIGS. 22–28 above. As directed by decision block 564, the linear scaling is performed for each stretch segment 572 in the stretch line. After all stretch segments have been used to transfer color data from the source line to the destination line, shading (assuming that at least a portion of the destination line was subject to a non-replicating stretch operation) may be applied to the destination line in block 564. The shading can be either linear (described above in connection with FIGS. 29–33) or non-linear (described in connection with FIGS. 38–39). The shading step of block 564 could alternatively be performed after each linear stretch step 560, prior to (or during) performing the stretch associated with the next stretch segment.

Further, as directed by decision block 566, steps shown in blocks 552–562 are repeated for each source line in the source image. The line draw engine 100 can use the same stretch line for each source line (assuming the lengths of the major axes for the source and destination lines do not change) or the host may vary the parametric or polyline data for various source lines.

Referring again to FIGS. 37a–37c, the process of FIG. 26 is described in connection with the example shown in FIGS. 34a and 34b. Corresponding pixels of this destination line are labelled on the source line for reference. As can be seen in FIG. 37a, the source line 534 alternates four black pixels with four white pixels for the length of the source line. Stretch segment 572a causes the shrink operation to skip four pixels in the source line 534 for each full slice four pixels in length) of the stretch segment 572a, resulting in the alternating black-white pixels D1–D7. Thereafter, stretch segment 572b causes a shrink operation skipping two pixels of the source line 534 for each often 2-pixel slices, resulting in destination pixels D8–D21. Stretch segment 572c causes a shrink operation which generates pixels D22–D32. Stretch segment 572d is a diagonal segment which generates a one-to-one mapping from source line 534 to destination line 536, generating color for pixels D33–D51. Segments 572e–572g perform shrink operations generally the same as stretch segments, 572c, 572b and 572a, respectively.

Non-Linear Shading

In certain instances, it is desirable to shade between two color points in a non-linear fashion. One example of non-linear shading would be in highlighting rendered objects.

In the preferred embodiment, shading between two color points is performed in a manner analogous to non-linear stretching. Each color point comprises one or more component colors. For a RGB colorspace, there would be three component colors. A polyline is generated between desired starting and ending magnitudes for each component color. The polyline may be defined directly from the host application by supplying the endpoints for each segment of the polyline or by defining points for a paramentric curve, which is subsequently translated to a polyline by the line draw engine 100 (described in greater detail below). The segments of the polyline (the "shading segments") are used to define the component colors for each pixel of the destination line using the technique described above for linear shading.

Figure 38:
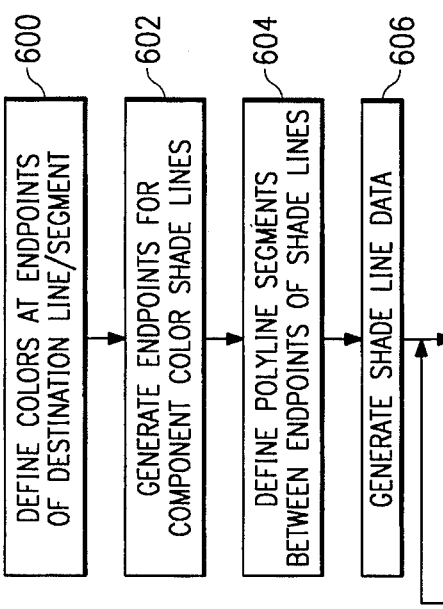
FIG. 38 is a flow chart describing a method of non-linear shading of a line.
Figure 39:
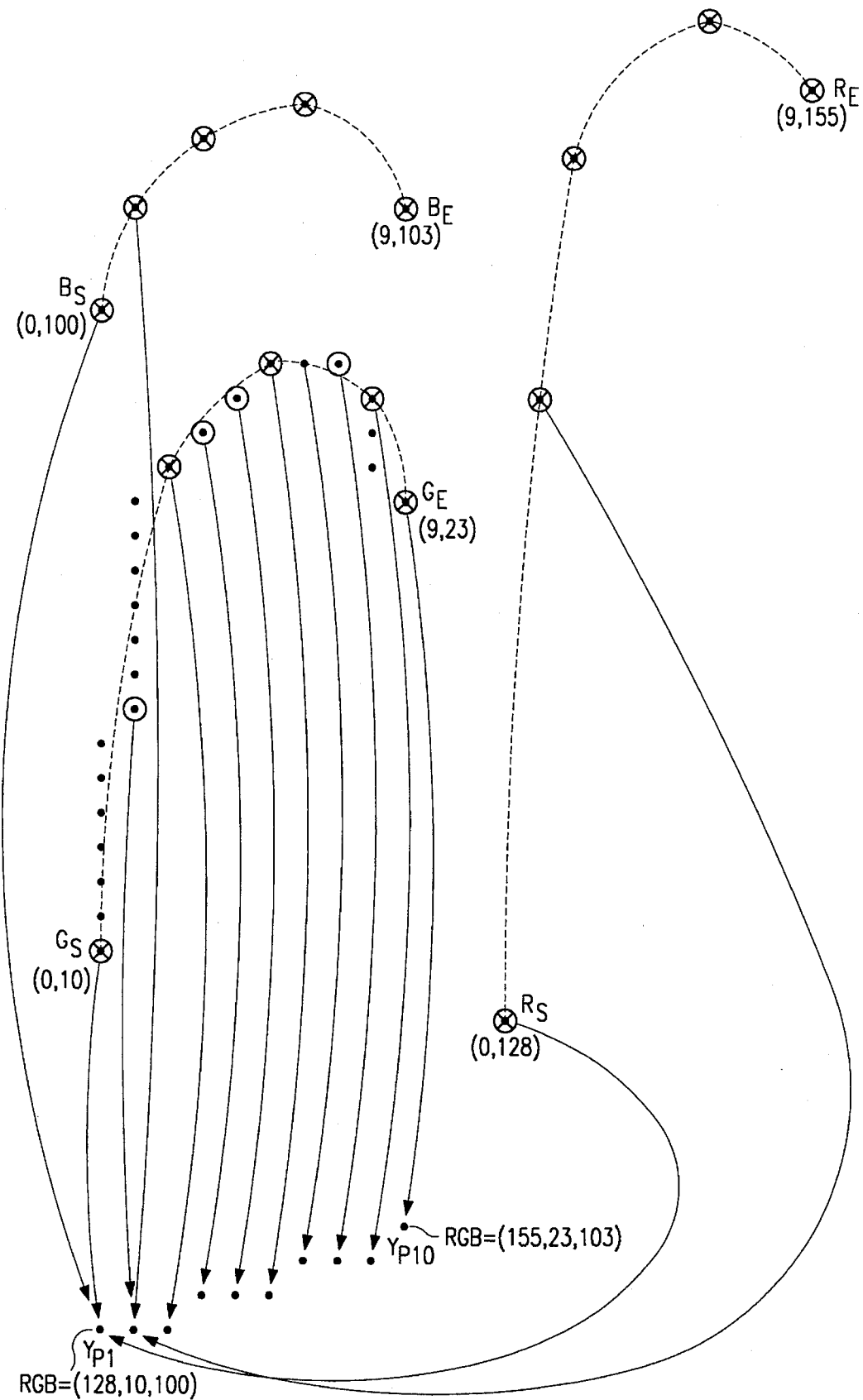
FIG. 39 is an example of applying non-linear shading to a line.

FIG. 38 illustrates a flow describing a non-linear shade, assuming that the locations of the pixels of the destination line have already been defined. In block 600, the endpoint colors, i.e. the colors at the endpoint of the destination line or destination line segment being shaded, are defined. In block 602, endpoints for the shading lines for each component color are generated as discussed above in connection with FIGS. 29–32. However, rather than providing a straight line between the endpoints of each color component, polylines are generated in block 604 to define the magnitude of the color components for each point in the destination line. As discussed in relation to non-linear scaling, these polylines may be defined by (1) polyline data from the host application or (2) by parametric curve data from the host application, from which data the line draw engine 100 derives the shading polylines for each component color. As can be seen in FIG. 39, for an RGB colorspace, each component color may have a different curve. While the curves in FIG. 39 are similar, it would be possible to provide an unrelated curve for each color component to derive an desired effect.

In block 606, the line draw engine 100 generates the shade lines for each color component from the data supplied from the host program. As with non-linear scaling, the segments for the shade lines can be generated as needed, concurrently with other line draw operations. In block 608, the linear segments comprising the shade line for each color component are used to generate color information for each pixel of the destination line in accordance with linear shading described above. The shading of block 608 is repeated by decision block 610 until each pixel of the destination line is colored.

FIG. 39 illustrates non-linear shade lines for the example of FIG. 31. The starting and ending magnitudes for each component shade line are given by the subscripts "S " and "E". The endpoint of the segments of the polylines for each component shading line are shown by a "(x)". For illustration purposes, the individual pixels for the component shade lines and the correspondance between individual pixels of the shade line and respective pixels of the destination line are shown only for the G line.

As can be seen from FIGS. 38 and 39, the segments of the polylines can be generated rapidly by the run slice line draw engine 100 and the data from these polylines can be used to quickly determine the intermediate magnitudes for each color at each point of the destination line, with a minimum of complex arithmatic. Since the line draw engine 100 can operate on multiple lines, the necessary segments for the component colors can generated as needed to most efficiently perform the linear shading as described above.

PARAMETRIC CURVES

The line draw engine 100 of the present invention may also be used to generate data approximating a desired parametric curve. A parametric curve can be described by the relation $y=a_n x^n+a_{n-1}x^{n-1}+\ldots+a_3 x^3+a_2 x^2+a_1 x+a_0$, where $a_n$–$a_0$ are constants. This equation can be decomposed as two equation relating to y and x as a function of t, where t represents the desired resolution (number of segments used to approximate the polyline). Thus, the preceding equation can be described by two equations in t:

$$x(t)=b_n t^n+b_{n-1}t^{n-1}+\ldots+b_3 t^3+b_2 t^2+b_1 t+b_0$$

$$y(t)=c_n t^n+c_{n-1}t^{n-1}+\ldots+c_3 t^3+c_2 t^2+c_1 t+c_0$$

Using the equation for x(t), the derivatives can be generated as:

$$x'(t)=nb_n t^{n-1}+(n-1)b_{n-1}t^{n-2}+\ldots+3b_3 t^2+2b_2 t+b_1$$

$$x''(t)=n(n-1)b_n t^{n-2}+(n-1)(n-2)b_{n-1}t^{n-3}+\ldots+6b_3 t+2b_2$$

and so forth.

For a third order polynomial, therefore:

$$x(t)=b_3 t^3+b_2 t^2+b_1 t+b_0$$

$$x'(t)=3b_3 t^2+2b_2 t+b_1$$

$$x''(t)=6b_3 t+2b_2$$

$$x'''(t)=6b_3$$

For the third order polynomial equation set forth above, the second derivative, $x''(t)$ is a straight line. For each point $t, x''(t)$ defines the slope of the line $x'(t)$. Similarly, for each point $t, x'(t)$ defines the slope of the line $x(t)$.

In the present invention, the transformer 121 has the ability to determine a second endpoint of a line based on a first endpoint, a slope and the length of the line along one of the axes (or, alternatively, the location of the first endpoint, DX and DY). As described below, this capability allows the engine to quickly determine a polyline approximation of a parametric equation at any desired resolution.

Figure 40:
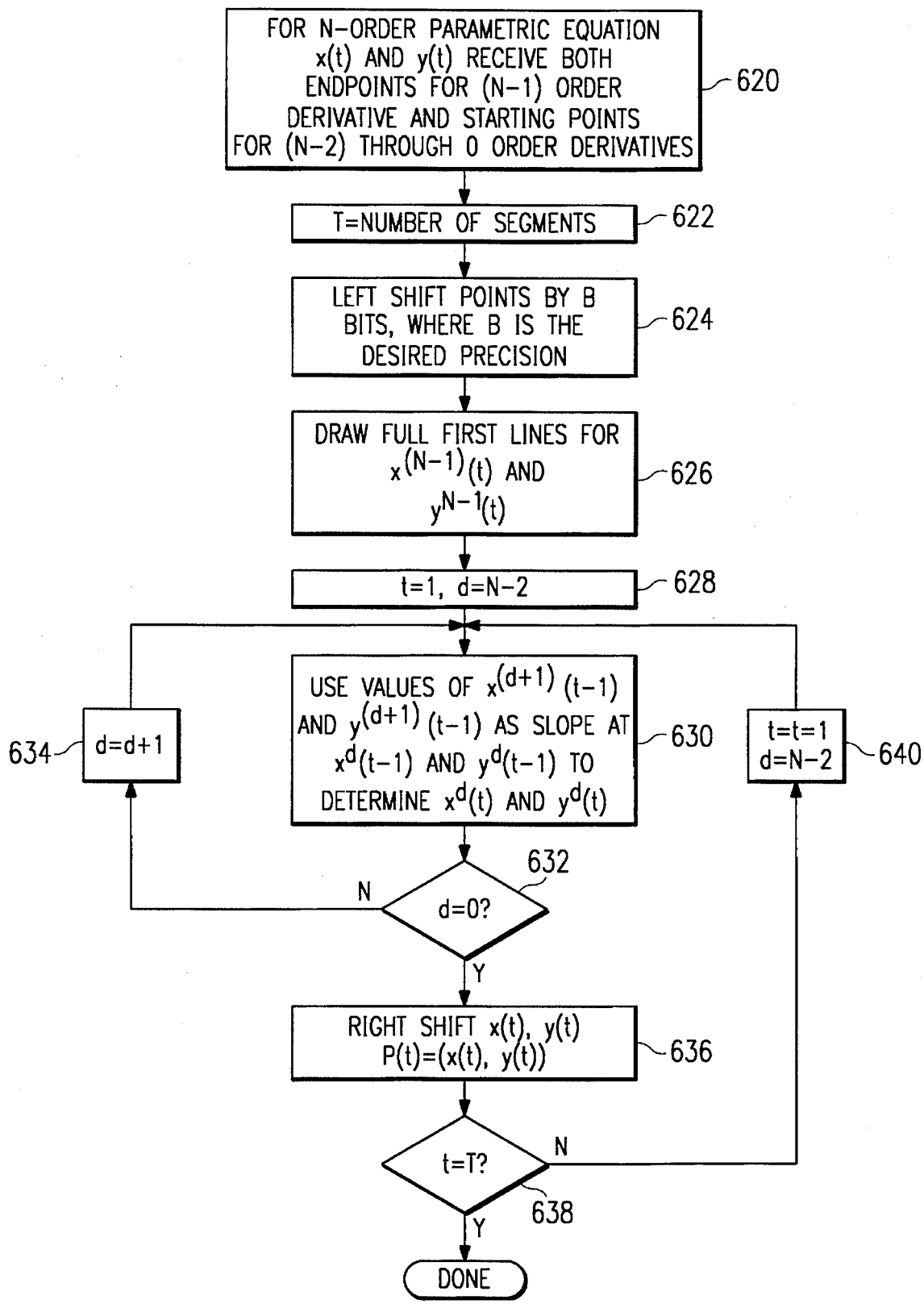
FIG. 40 is a flow chart describing polyline approximation of parametric equations.
Figure 41:
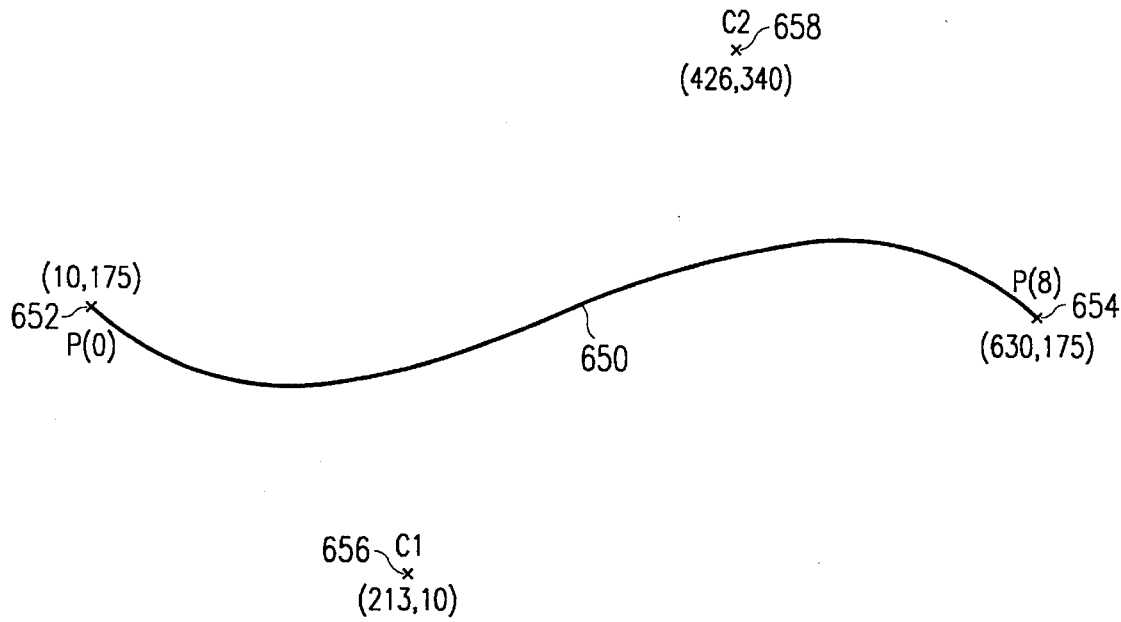
FIG. 41 illustrates an example of a Bezier curve.
Figure 42:
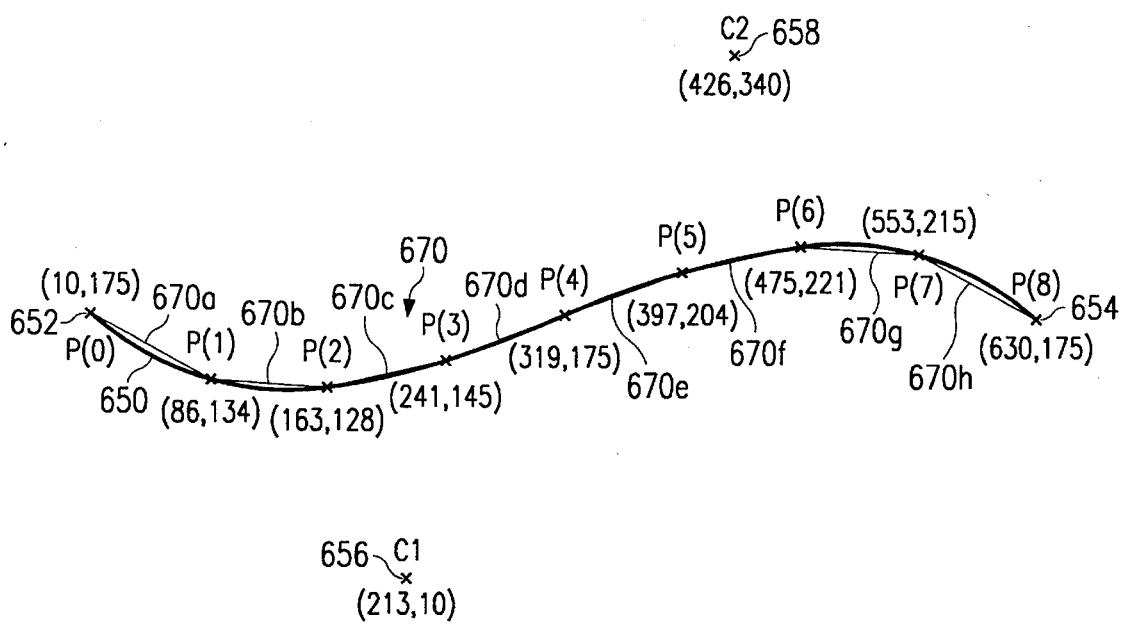
FIG. 42 illustrates an example of a polyline approximation of the Bezier curve of FIG. 41.
Figure 43:
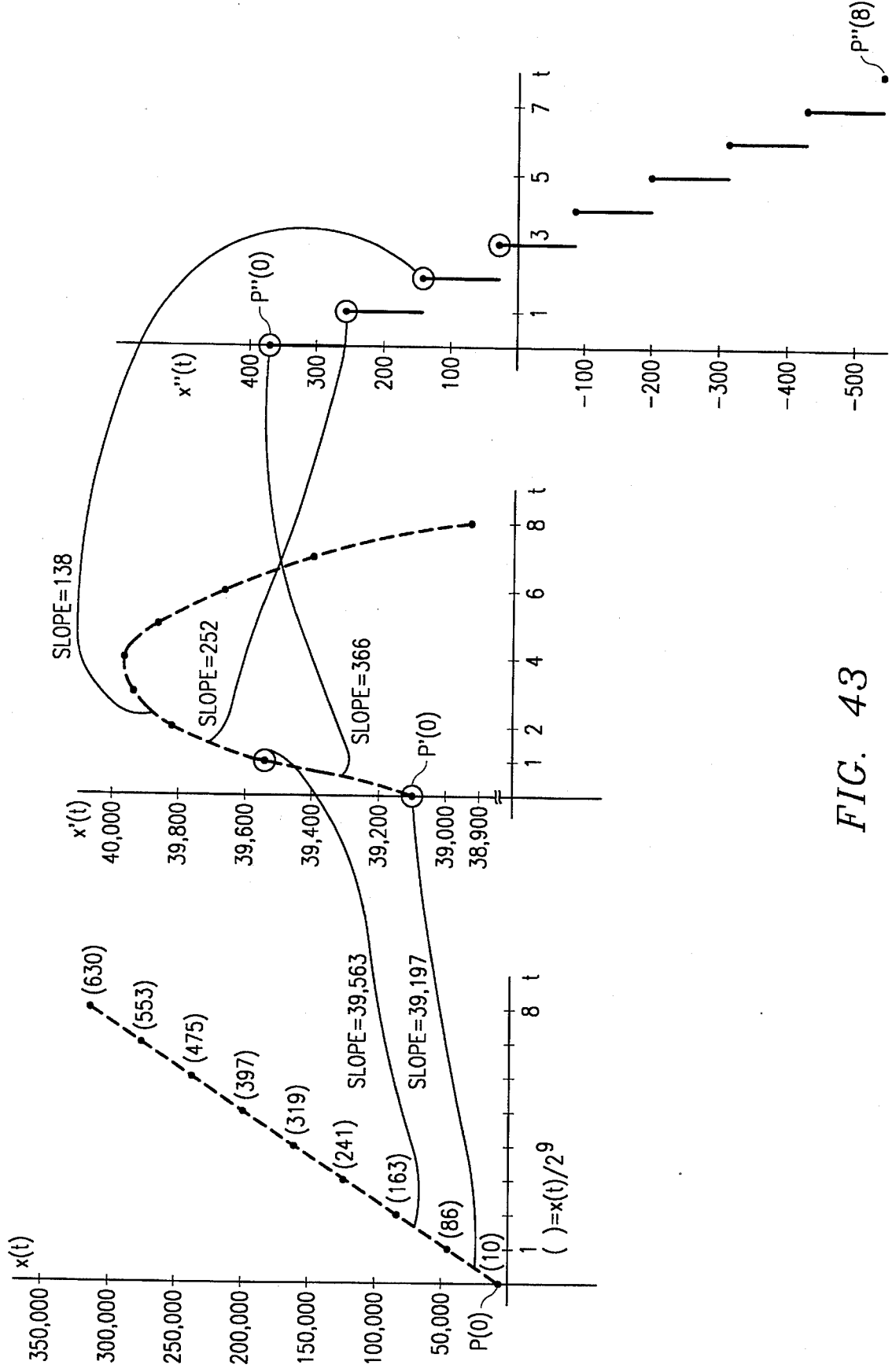
FIGS. 43 and 44 illustrates generation of the x(t) and y(t) polyline approximations of the Bezier curve of FIG. 41 by using points of their derivatives to provide slope information.
Figure 44:
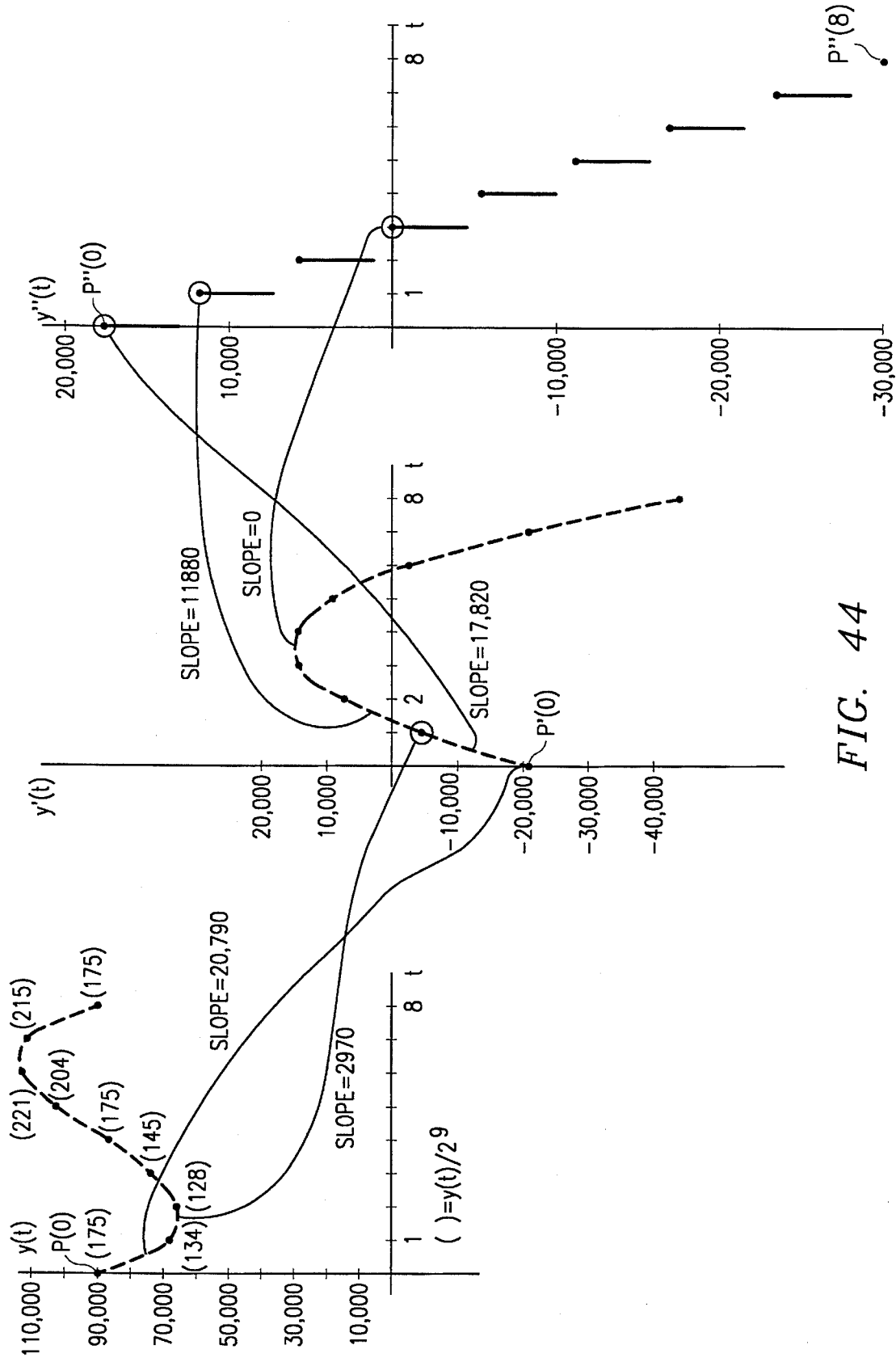

FIG. 40 is a flow chart describing the determination of a polyline approximation of a parametric equation. To further illustrate the method of FIG. 40, FIGS. 41–44 depict the generation of a polyline approximation for a third order parametric equation (also known as a Bezier curve), described as a line between two endpoints and first and second control points. FIG. 41 shows a Bezier curve 650 between endpoints 652 and 654 at (10, 175) and (630, 175), with a first control point 656 at (213, 10) and a second control point 658 at (630, 175). FIG. 42 shows a polyline approximation 670 of the Bezier curve 650 of FIG. 41. The polyline approximation 670 has eight segments 670a–670f, determined as described below. FIGS. 43 and 44 illustrate determination of the polyline approximation data from information received from the host application. As can be seen in FIGS. 43 and 44, the data for the parametric equation is decomposed into two curves x(t) and y(t), where $0 \leq t \leq T$ and T equals the desired number of polyline segments for the approximation. For the example of FIG. 41, $x(t)=-19t^3+30t^2\alpha 609^t+10$ and $y(t)=-990t^3+1485t^2-495t+175$.

In block 620, data is received from the host application defining the desired curve. In the preferred embodiment, the host application passes, for both x(t) and y(t), the information shown in FIG. 43 and 44: (1) the endpoints of the (N–1) order derivative (for the N=3 order equation shown in the examples of FIG. 41–44, this would be the endpoints of the second derivative, labeled P"(0) and P"(8)), (2) the starting point of each derivative (labeled P'(0) in FIGS. 43 and 44) and for x(t) and y(t) (i.e., the value at t=0, labeled P(0)). In block 622 of FIG. 40, value T is defined as the number of segments used to approximate the parametric equation. As described above, a larger T will more closely approximate the actual curve. T can be determined as the length of the minor axis of the (N–1) order derivative. In FIG. 42, the approximation is shown with eight segments, and hence T=8. Additionally, the host application can pass a number defining the bits of precision, B. In block 624, the points passed by the host application are left-shifted by B bits. For the example of FIGS. 41–44, B is set to "9".

In block 626, Full First lines are drawn for the N–1 derivative, i.e. $x^{(N-1)}(t)$ and $y^{(N-1)}(t)$. Because of the large magnitude of DY relative to DX (which is equal to T) due to the left-shift of block 624, $x^{(N-1)}(t)$ and $y^{(N-1)}(t)$ will always have vertical slices (assuming the x-axis is the t axis), since $b_n$ and $c_n$ must be non-zero if $a_n$ is non-zero.

In block 628–640, the endpoints for each segment of the polyline are generated. In block 628, t is set to "1" and d is set to N–2. At any point $t, x^{(d)}(t)$ has a slope equal to $x^{(d+1)}(t)$. Similarly, $y^{(d)}(t)$ has a slope equal to $y^{(d+1)}(t)$. Because the transformer 121 is designed to generate a second endpoint from a first endpoint and a slope, the second endpoint ($x^{(d)}(t)$ or $y^{(d)}(t)$) for a segment can be generated by supplying the transformer 121 with the first endpoint, $x^{(d)}(t-1)$ or $y^{(d)}(t-1)$, and the slope $x^{(d+1)}(t-1)$ or $y^{(d+1)}(t-1)$.

For $X^{(N-2)}(t)$ and $y^{(N-2)}(t)$, the slope can be determined from taking the value of the first point of the slice at t for the Full First lines generated in block 626. Hence, $x^{(N-2)}(t+1)$ and $y^{(N-2)}(t+1)$ can be generated by the transformer 121 using the slope defined by next highest order derivative at point t. Calculation of the points at each derivative and at x(t) and y(t) can thus be calculated by reference to the point at (t–1) and the next highest derivative at point t–1. When d=0 (block 632), the point P(t)=(x(t), y(t)) can be set after right-shifting the values of x(t) and y(t) in block 636. P(t) is the second endpoint for segment t. Thus, segment t=1 has endpoints defined by the starting point and P(1), segment t=2 has endpoints defined by P(1) and P(2), segment t=3 has endpoints defined by P(2) and P(3) and so on. When t=T in block 638, all endpoints have been defined.

TABLE VI

Intermediate Point Determination

| t | x(t) | x'(t) | x"(t) | y(t) | y'(t) | y"(t) |
|---|------|-------|-------|------|-------|-------|
| 0 | 5120 | 39197 | 366 | 89600 | –20790 | 17820 |
| 1 | 44317 | 39563 | 252 | 68810 | –2970 | 11880 |
| 2 | 83880 | 39815 | 138 | 65840 | 8910 | 5940 |
| 3 | 123695 | 39953 | 24 | 74750 | 14850 | 0 |
| 4 | 163648 | 39977 | –90 | 89600 | 14850 | –5940 |
| 5 | 203625 | 39887 | –204 | 104450 | 8910 | –11880 |
| 6 | 243512 | 39683 | –318 | 113360 | –2970 | –17820 |
| 7 | 283195 | 39365 | –432 | 110390 | –20790 | –23760 |
| 8 | 322560 | 38933 | –546 | 89600 | –44550 | –29700 |

TABLE VII

Determination of Polyline Approximation of Parametric Equation

| t | x(t) | y(t) |
|---|------|------|
| 0 | 10 | 175 |
| 1 | 86 | 134 |
| 2 | 163 | 128 |
| 3 | 241 | 145 |
| 4 | 319 | 175 |
| 5 | 397 | 204 |
| 6 | 475 | 221 |

TABLE VII-continued

Determination of Polyline Approximation of Parametric Equation

| t | x(t) | y(t) |
|---|------|------|
| 7 | 553  | 215  |
| 8 | 630  | 175  |

Tables VI and VII show the data used in the example of FIGS. 41–44. The points at t=0 (P(0), P'(0) and P"(0)) and the second endpoint of the (N−2) order derivative (P"(8)) are set by the host application. For t=1, x"(1) is defined by the first point of the first slice, x"(0), which is equal to 366. This slope is used by the transformer 121 to determine the endpoint of a straight line starting at (0, 39197), the starting point for the first derivative, with DX=1. The resulting point, (1, 39563), equals x'(1). Similarly, x(1) is determined by the transformer 121 using a line of slope 39,197 from point (0, 5120), the starting point of x(t), yielding the point (1, 44317). The value of y(1) is determined using the same steps. P(1) can then be set to (x(1)/$2^9$, y(1)/$2^9$)=(10,175).

CONCLUSION

The present invention is capable of drawing high speed lines using run slice techniques. Further, the capability of generating points or drawing lines while the run slice parameters are being calculated increases the speed and efficiency of the line draw engine. The steps necessary to draw a run slice line are greatly reduced by generating a repeat count which indicates the number of like sized slices within a group. In addition to drawing lines, the line draw engine can be used to perform many or all of the accelerated functions such as polygon fills, stretching, shrinking and shading, as described herein. Control parameters to control points chosen for a line, such as Points First or Full First, increase the functionality of the line draw engine. Non-linear functions can be applied to scaling or shading through the use of polyline approximations of the non-linear function, which allows the non-linear scaling or shading to be performed as a series of linear scaling or shading operations. Parametric functions can be quickly approximated as a polyline generated in the line draw engine by providing minimal information regarding the Parametric equation and its derivatives.

Although the present invention and its advantages have been described in detail, it should be understood that various changes, substitutions and alterations can be made herein without departing from the spirit and scope of the invention as defined by the appended claims.

What is claimed:

1. A method of shading a destination line according to a desired non-linear function, wherein the destination line includes a first endpoint of a first color and a second endpoint of a second color and wherein said first color of the first endpoint and said second color of the second endpoint are composed of one or more color components, comprising the steps of:

generating information for defining the locations of points of the destination line;

for each color component of said first color of the first endpoint and said second color of the second endpoint, generating a shading polyline having a plurality of linear segments, said shading polyline defined responsive to the desired non-linear function for the color component and having a first polyline endpoint having an associated value corresponding to the respective color component of said first color of the first endpoint and a second polyline endpoint having an associated value corresponding to the respective color component of said second color of the second endpoint;

for each linear segment of said shading polyline, generating information for defining locations of points in the linear segment; and for each linear segment of each shading polyline, mapping the points of said destination line to respective points of each linear segment to determine a value for the component color for the points along said destination line.

2. The method of claim 1 wherein said non-linear function is defined by a parametric equation.

3. The method of claim 1 wherein said step of for each linear segment of said shading polyline, generating information for defining locations of points in the linear segment comprises the step of generating information for defining the location of points for each linear segment of said shading polyline as one or more slices between first and second locations defining each linear segment, each slice formed of a one or more contiguous points.

4. The method of claim 3 and further comprising the step of assigning a slice length to each slice based on the number of points in the slice and the orientation of the slice.

5. The method of claim 4 wherein said mapping step comprises the step of mapping points of the destination line to respective points of one or more linear segments to determine component color values, said mapping being performed responsive to the length of the slices of the destination line and the length the slices of the one or more linear segments.

6. The method of claim 5 wherein said mapping step further comprises the step of storing one slice from each of said destination line and said one or more segments in a buffer.

7. The method of claim 1 and further comprising the step of receiving a series of points from a host application program defining the endpoints of each segment for each shading polyline.

8. The method of claim 1 and further comprising the step of receiving a series of points from a host program defining a parametric equation for each shading polyline.

9. Line draw circuitry for shading a destination line according to a non-linear function, wherein the destination line includes a first endpoint of a first color and a second endpoint of a second color and said first color of the first endpoint and said second color of the second endpoint are composed of one or more color components, comprising:

circuitry for receiving information defining said destination line;

circuitry for:

generating information for defining the locations points of the destination line; and for each component color of said first color of the first endpoint and of the second color of the second endpoint, generating information for defining the locations of points in a shading polyline having a plurality of linear segments, said shading polyline defined responsive to the desired non-linear function for each color component and having a first polyline endpoint having an associated value corresponding to the respective color component of said first color of the first endpoint and a second polyline endpoint having an associated value corresponding to the respective color component of said second color of the second endpoint; and circuitry for mapping points of said destination line to respective points of linear segments of said shading polylines to determine a value for the component color at each point of the destination line.

10. The line draw circuitry of claim 9 wherein said non-linear function is defined by a parametric equation.

11. The line draw circuitry of claim 9 wherein said circuitry for generating information defining the locations of points of said shading polyline comprises circuitry for generating information for defining the location of points for each linear segment of said shading polyline as one or more slices between first and second locations defining each segment, each slice formed of one or more contiguous points.

12. The line draw circuitry of claim 11 and further comprising circuitry for assigning a slice length to each slice based on the number of points in the slice and the orientation of the slice.

13. The line draw circuitry of claim 12 wherein said mapping step comprises circuitry for mapping points of the destination line to respective points of one or more linear segments of said shading polylines to determine component color values, said mapping being performed responsive to the length of the slices of the destination line and the length of the slices of the one or more linear segments.

14. The line draw circuitry of claim 13 wherein said mapping circuitry further comprises circuitry for storing one slice from each of said destination line and said one or more segments in a buffer.

15. The line draw circuitry of claim 9 and further comprising circuitry for receiving a series of points from a host application program defining the endpoints of each segment for each shading polyline.

16. The line draw circuitry of claim 9 and further comprising circuitry for receiving a series of points from a host program defining a parametric equation for each shading polyline.

17. A computer system comprising:
a processor;
a memory subsystem coupled to said processor;
a video display; and
a video controller coupled to said processor and said video display including line draw circuitry for applying color information to a first line between a first endpoint of a first color and a second endpoint of a second color, each color composed of one or more color components, comprising:
circuitry for receiving information defining said destination line;
circuitry for:
generating information for defining the locations of points of the destination line; and for each component color of said first color of the first endpoint and of the second color of the second endpoint, generating information for defining the locations of points in a shading polyline having a plurality of linear segments, said shading polyline defined responsive to the desired non-linear function for each color component and having a first polyline endpoint having an associated value corresponding to the respective color component of said first color of the first endpoint and a polyline second endpoint having an associated value corresponding to the respective color component of said second color of the second endpoint; and circuitry for mapping points of said destination line to respective points of linear segments of said shading polylines to determine a value for the component color at each point of the destination line.

18. The computer system of claim 17 wherein said non-linear function is defined by a parametric equation.

19. The computer system of claim 17 wherein said circuitry for generating information defining the locations of points of said shading polyline comprises circuitry for generating information for defining the location of points of each linear segment of the polyline as one or more slices between first and second locations defining each linear segment, each slice formed of a one or more contiguous points.

20. The computer system of claim 19 wherein said video controller further comprises circuitry for assigning a slice length to each slice based on the number of points in the slice and the orientation of the slice.

21. The computer system of claim 20 wherein said mapping step comprises circuitry for mapping points of the destination line to respective points of one or more linear segments to determine component color values, said mapping being performed responsive to the length of the slices of the destination line and the length of the slices of the one or more linear segments.

22. The computer system of claim 21 wherein said mapping circuitry further comprises circuitry for storing one slice from each of said destination line and said one or more segments in a buffer.

23. The computer system of claim 17 and wherein said video controller further comprises circuitry for receiving a series of points from a host application program defining the endpoints of each segment for each shading polyline.

24. The computer system of claim 17 and wherein said video controller further comprises circuitry for receiving a series of points from a host program defining a parametric equation for each shading polyline.

* * * * *